US012639844B2

(12) United States Patent
Bolognesi et al.

(10) Patent No.: US 12,639,844 B2
(45) Date of Patent: May 26, 2026

(54) IMAGE PROCESSING FOR AN APPLIANCE

(71) Applicant: WHIRLPOOL CORPORATION,
Benton Harbor, MI (US)

(72) Inventors: Mauro Bolognesi, Biandronno (IT);
Seth Douglas Herndon, Osceola, IN
(US); Tolulope Adedapo Odetola, St.
Joseph, MI (US); **Mohammad
Haghighat**, San Jose, CA (US);
Mohammad Nasir Uddin Laskar,
Sunnyvale, CA (US); **Harshil
Pareshbhai Shah**, Sunnyvale, CA (US);
Saqib Nizam Shamsi, Najibabad (IN);
Bereket Ayalneh Sharew, Santa Clara,
CA (US)

(73) Assignee: Whirlpool Corporation, Benton
Harbor, MI (US)

( * ) Notice: Subject to any disclaimer, the term of this
patent is extended or adjusted under 35
U.S.C. 154(b) by 365 days.

(21) Appl. No.: 18/102,354

(22) Filed: Jan. 27, 2023

(65) Prior Publication Data
US 2024/0257388 A1 Aug. 1, 2024

(51) Int. Cl.
G06T 7/73 (2017.01)
G06T 7/33 (2017.01)
(Continued)

(52) U.S. Cl.
CPC .............. G06T 7/74 (2017.01); G06T 7/337
(2017.01); G06T 7/60 (2013.01); G06V 20/50
(2022.01);
(Continued)

(58) Field of Classification Search
CPC .. G06T 7/74; G06T 7/337; G06T 7/60; G06T
2207/20081; G06T 2207/20084; G06T
2207/30244; G06V 20/50
See application file for complete search history.

(56) References Cited

U.S. PATENT DOCUMENTS 8,605,153 B2 12/2013 Sasaki et al.
9,538,880 B2 1/2017 Riefenstein
(Continued)

FOREIGN PATENT DOCUMENTS

DE 102016107617 A1 10/2017
EP 3163533 A1 5/2017
(Continued)

OTHER PUBLICATIONS

Y. Zhou, L. Shi and B. Yuan, "A Generative Adversarial Network-
based Framework for Fruit and Vegetable Occlusion Detection in
Smart Refrigerators," 2021 International Conference on Signal
Processing and Machine Learning (CONF-SPML), Stanford, CA,
USA, 2021, pp. 290-295 (Year: 2021).*
(Continued)

*Primary Examiner* — Gregory A Morse
*Assistant Examiner* — Ty Mitchell Beatty
(74) *Attorney, Agent, or Firm* — Price Heneveld LLP

(57) ABSTRACT

A method for processing images of an appliance includes
capturing, via an imaging device, an image of a cavity of the
appliance. The method further includes identifying a support
member in the cavity based on the image via a processor in
communication with the imaging device. The support mem-
ber is configured to support an object thereon. The method
further includes calculating a histogram of gradients based
on the image via the processor. The method further includes
receiving dimensional data of the appliance. The method
further includes comparing the histogram of gradients to the
dimensional data. The method further includes determining
a position of the support member based on the comparison
of the histogram of gradients to the dimensional data.

18 Claims, 18 Drawing Sheets

(51) Int. Cl.
　　*G06T 7/60*　　　　(2017.01)
　　*G06V 20/50*　　　(2022.01)

(52) U.S. Cl.
　　CPC ............... *G06T 2207/20081* (2013.01); *G06T 2207/20084* (2013.01); *G06T 2207/30244* (2013.01)

(56) References Cited

U.S. PATENT DOCUMENTS

| | | | | |
|---|---|---|---|---|
| 9,644,847 | B2 * | 5/2017 | Bhogal | H05B 1/0263 |
| 10,798,947 | B2 | 10/2020 | Dingman et al. | |
| 10,962,228 | B2 | 3/2021 | Park et al. | |
| 11,004,182 | B2 | 5/2021 | Farivar et al. | |
| 11,022,322 | B2 | 6/2021 | Clayton et al. | |
| 2012/0138092 | A1 * | 6/2012 | Ashrafzadeh | A47L 15/4295 134/57 D |
| 2014/0133755 | A1 | 5/2014 | McCloskey | |
| 2018/0330470 | A1 | 11/2018 | Karki et al. | |
| 2019/0110638 | A1 | 4/2019 | Li et al. | |
| 2019/0132709 | A1 * | 5/2019 | Graefe | H04W 4/46 |
| 2020/0356812 | A1 | 11/2020 | Oleyuik et al. | |
| 2021/0133936 | A1 | 5/2021 | Chandra et al. | |
| 2021/0150751 | A1 | 5/2021 | Liu et al. | |
| 2021/0186032 | A1 | 6/2021 | Giacomini | |
| 2021/0207811 | A1 | 7/2021 | Adam et al. | |
| 2021/0231311 | A1 | 7/2021 | Ye et al. | |

FOREIGN PATENT DOCUMENTS

| | | | |
|---|---|---|---|
| EP | 3767580 | A1 | 1/2021 |
| WO | WO20120172 | A1 | 6/2020 |
| WO | WO21122022 | A1 | 6/2021 |

OTHER PUBLICATIONS

Lindqvist, Niklas. "Evaluation of multi-view input using dynamic images for action recognition at a vending fridge." (2020). (Year: 2020).*

Sobociński, P., Strugała, D., Walczak, K., Maik, M., Jenek, T. (2021). Large-Scale 3D Web Environment for Visualization and Marketing of Household Appliances. In: De Paolis, L.T., Arpaia, P., Bourdot, P. (eds) Augmented Reality, Virtual Reality, and Computer Graphics. AVR 2021. Lecture Notes in Compute.*

LIBSVM: A library for support vector machines by Chang et al., Pub. 2011 (Year: 2011).*

Using Pyramid of Histogram of Oriented Gradients by Tan et al., Pub. IEEE 2014 (Year: 2014).*

Bolanos et al., Simultaneous Food Localization and Recognition.

He et al., Food Image Analysis_ Segmentation, Identification and Weight Estimation.

Chih-Chung Chang and Chih-Jen Lin, "Libsvm: A Library for Support Vector Machines," ACM Transactions on Intelligent Systems and Technology, vol. 2, No. 3, Article 27, Publication Date: Apr. 2011.

Zhi Rong Tan, Shangxuan Tian, and Chew Lim Tan, "Using Pyramid of Histogram of Oriented Gradients On Natural Scene Text Recognition," Department of Computer Science, School of Computing, National University of Singapore, ICIP 2014, pp. 2629-2633.

* cited by examiner

24

START

CAPTURE IMAGE OF CAVITY OF APPLIANCE    S100

IDENTIFY SUPPORT MEMBER DISPOSED IN CAVITY SUPPORTING AN OBJECT    S102

DETERMINE HISTOGRAM OF GRADIENTS BASED ON IMAGE    S104

DETERMINE POSTION OF THE SUPPORT MEMBER BASED ON HISTOGRAM OF GRADIENTS    S106

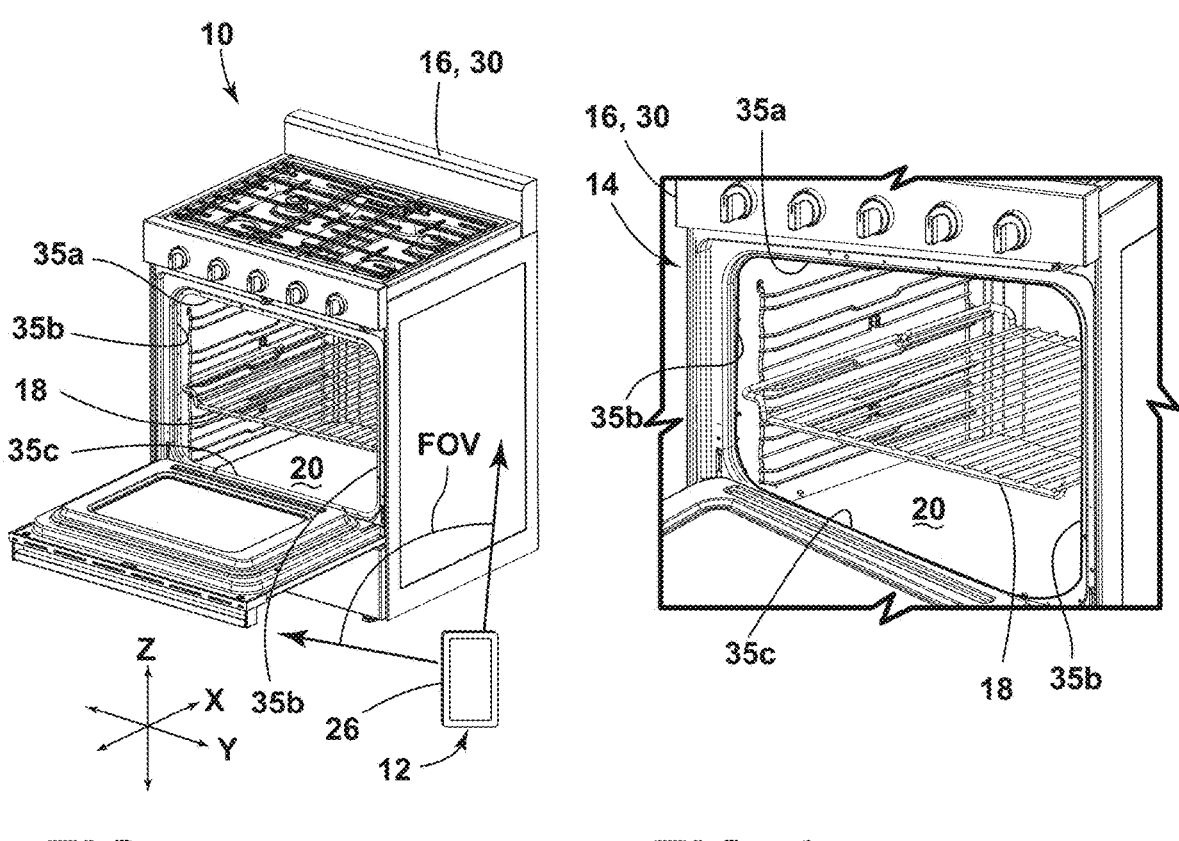
FIG. 5 FIG. 6
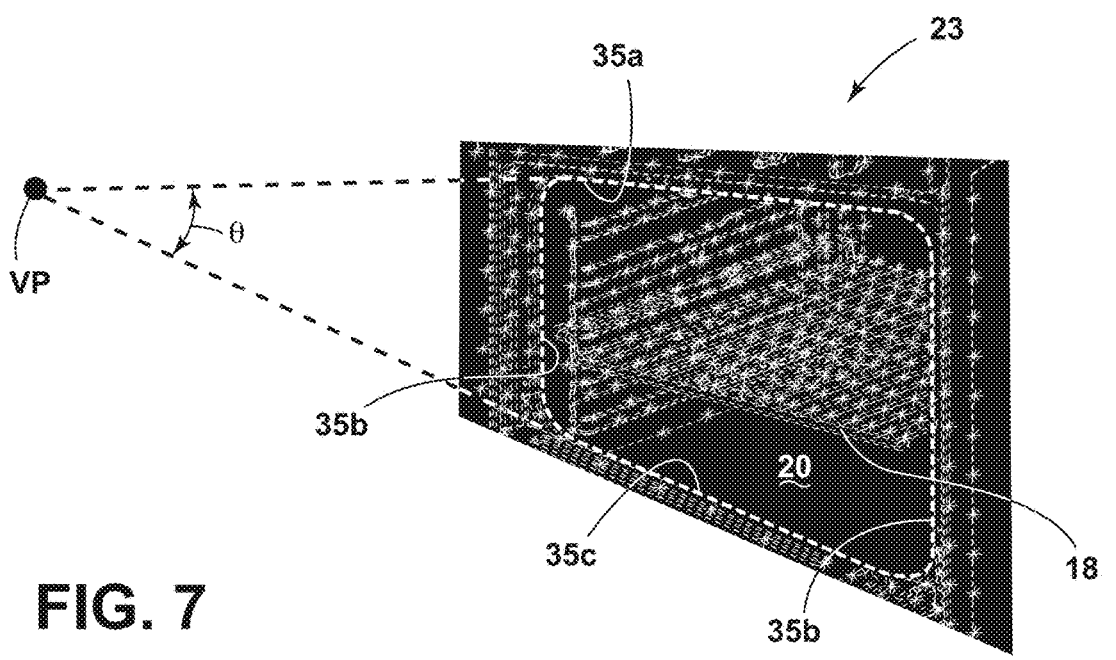
FIG. 7

1

IMAGE PROCESSING FOR AN APPLIANCE

BACKGROUND OF THE DISCLOSURE

The present disclosure generally relates to image processing for an appliance and, more specifically, to systems and methods for processing images of the contents of a kitchen appliance.

SUMMARY OF THE DISCLOSURE

According to one aspect of the present disclosure, an image processing method for a cooking system includes capturing, via at least one imaging device, an image of a cooking cavity of the cooking appliance. The method further includes identifying a support member in the cooking cavity based on the image via a processor in communication with the at least one imaging device. The support member is configured to support a food item thereon. The method further includes determining a histogram of gradients based on the image via the processor. The method further includes determining a position of the support member based on the histogram of gradients.

According to another aspect of the present disclosure, a cooking system includes a cooking appliance that includes a cooking cavity for receiving a food item. A support member is disposed in the cooking cavity and configured to support the food item thereon. An imaging device is configured to capture an image of the cooking cavity from an initial view. A processor is in communication with the imaging device and configured to identify the support member based on the image, determine a histogram of gradients based on the image, and determine a position of the support member based on the histogram of gradients.

According to another aspect of the present disclosure, an image processing method for a cooking system includes capturing, via an imaging device, an image of a cooking cavity of a cooking appliance from an initial view. The method further includes identifying a support rack in the cooking cavity based on the image via a processor in communication with the imaging device. The support rack is configured to support a food item thereon. The method further includes determining a histogram of gradients based on an orientation of a rail of the support rack in the image via the processor. The method further includes determining a position of the support rack based on the histogram of gradients. The method further includes determining a transformation matrix based on the position of the support rack. The method further includes processing the image in the transformation matrix to generate a target view of the cooking cavity different than the initial view.

According to another aspect of the present disclosure, an image processing method for a climate-controlled storage system includes capturing, via at least one imaging device, an image of a storage cavity of a storage appliance. The method further includes identifying a support member in the storage cavity based on the image via a processor in communication with the at least one imaging device. The support member is configured to support a food item thereon. The method further includes determining a histogram of gradients based on the image via the processor. The method further includes determining a position of the support member based on the histogram of gradients.

According to another aspect of the present disclosure, a climate-controlled storage system includes a storage appliance that includes a storage cavity for receiving a food item. A support member is disposed in the storage cavity and configured to support the food item thereon. An imaging device is configured to capture an image of the storage cavity from an initial view. A processor is in communication with the imaging device and configured to identify the support member based on the image, determine a histogram of gradients based on the image, and determine a position of the support member based on the histogram of gradients.

According to another aspect of the present disclosure, an image processing method for a refrigerator system includes capturing, via an imaging device, an image of a storage cavity of a refrigerator from an initial view. The method further includes identifying a support shelf in the storage cavity based on the image via a processor in communication with the imaging device. The support shelf is configured to support a food item thereon. The method further includes determining a histogram of gradients based on the support shelf in the image via the processor. The method further includes determining a position of the support shelf based on the histogram of gradients. The method further includes determining a transformation matrix based on the position of the support shelf. The method further includes processing the image in the transformation matrix to generate a target view of the storage cavity different than the initial view.

According to another aspect of the present disclosure, an image processing method for a dish treatment system includes capturing, via at least one imaging device, an image of a treatment cavity of a dish treatment appliance. The method further includes identifying a support member in the treatment cavity based on the image via a processor in communication with the at least one imaging device. The support member is configured to support a dish thereon. The method further includes determining a histogram of gradients based on the image via the processor. The method further includes determining a position of the support member based on the histogram of gradients.

According to another aspect of the present disclosure, a dish treatment system includes a dish treatment appliance that includes a treatment cavity for receiving a dish. A support member is disposed in the treatment cavity and configured to support the dish thereon. An imaging device is configured to capture an image of the treatment cavity from an initial view. A processor is in communication with the imaging device and configured to identify the support member based on the image, determine a histogram of gradients based on the image, and determine a position of the support member based on the histogram of gradients.

According to another aspect of the present disclosure, an image processing method for a dishwasher system includes capturing, via an imaging device, an image of a treatment cavity of a dishwasher from an initial view. The method further includes identifying a support rack in the treatment cavity based on the image via a processor in communication with the imaging device. The support rack is configured to support a dish thereon. The method further includes determining a histogram of gradients based on an orientation of a rail of the support rack in the image via the processor. The method further includes determining a position of the support rack based on the histogram of gradients. The method further includes determining a transformation matrix based on the position of the support rack. The method further includes processing the image in the transformation matrix to generate a target view of the treatment cavity different than the initial view.

According to another aspect of the present disclosure, a method for processing images of an appliance includes capturing, via at least one imaging device, an image of a cavity of the appliance. The method further includes identifying a support member in the cavity based on the image via a processor in communication with the at least one imaging device. The support member is configured to support an object thereon. The method further includes determining a histogram of gradients based on the image via the processor. The method further includes determining a position of the support member based on the histogram of gradients. The method further includes determining a position of the object based on the position of the support member.

According to another aspect of the present disclosure, an image processing system for an appliance includes a camera configured to capture an image of a cavity of the appliance. A support member is disposed in the cavity and configured to support an object thereon. A processor is in communication with the camera and configured to identify the support member based on the image, determine a histogram of gradients based on the image, determine a position of the support member based on the histogram of gradients, and determine a position of the object based on the position of the support member.

According to another aspect of the present disclosure, a method for processing images of an appliance includes capturing, via an imaging device, an image of a cavity of the appliance. The method further includes identifying a support member in the cavity based on the image via a processor in communication with the imaging device. The support member is configured to support an object thereon. The method further includes calculating a histogram of gradients based on the image via the processor. The method further includes receiving dimensional data of the appliance. The method further includes comparing the histogram of gradients to the dimensional data. The method further includes determining a position of the support member based on the comparison of the histogram of gradients to the dimensional data.

According to another aspect of the present disclosure, a system for processing images of an appliance includes an imaging device configured to capture an image of a cavity of the appliance. A support member is disposed in the cavity and configured to support an object thereon. A processor is in communication with the imaging device and configured to determine dimensional data of the appliance based on an identity of the appliance, calculate a histogram of gradients based on the image, compare the histogram of gradients to the dimensional data, and determine a position of a support member in the cavity based on the comparison of the histogram of gradients to the dimensional data.

According to another aspect of the present disclosure, a system for processing images of an appliance includes an imaging device configured to capture an image of a cavity of the appliance. A support member is disposed in the cavity and configured to support an object thereon. A processor is in communication with the imaging device and configured to identify the support member in the cavity based on the image and compare the image to target image data of the cavity. The target image data includes a plurality of images having support members positioned at a plurality of heights in the cavity. The processor is further configured to determine a position of the support member based on the comparison of the image to the target image data and determine a location of the object based on the position of the support member.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 5 is a perspective view of an appliance and a mobile device capturing an image of the appliance from a side perspective view;

FIG. 6 is an image of the appliance captured by the mobile device of FIG. 5;

FIG. 7 is a rendering of a histogram of gradients of the image depicted in FIG. 6;

Figure 1:
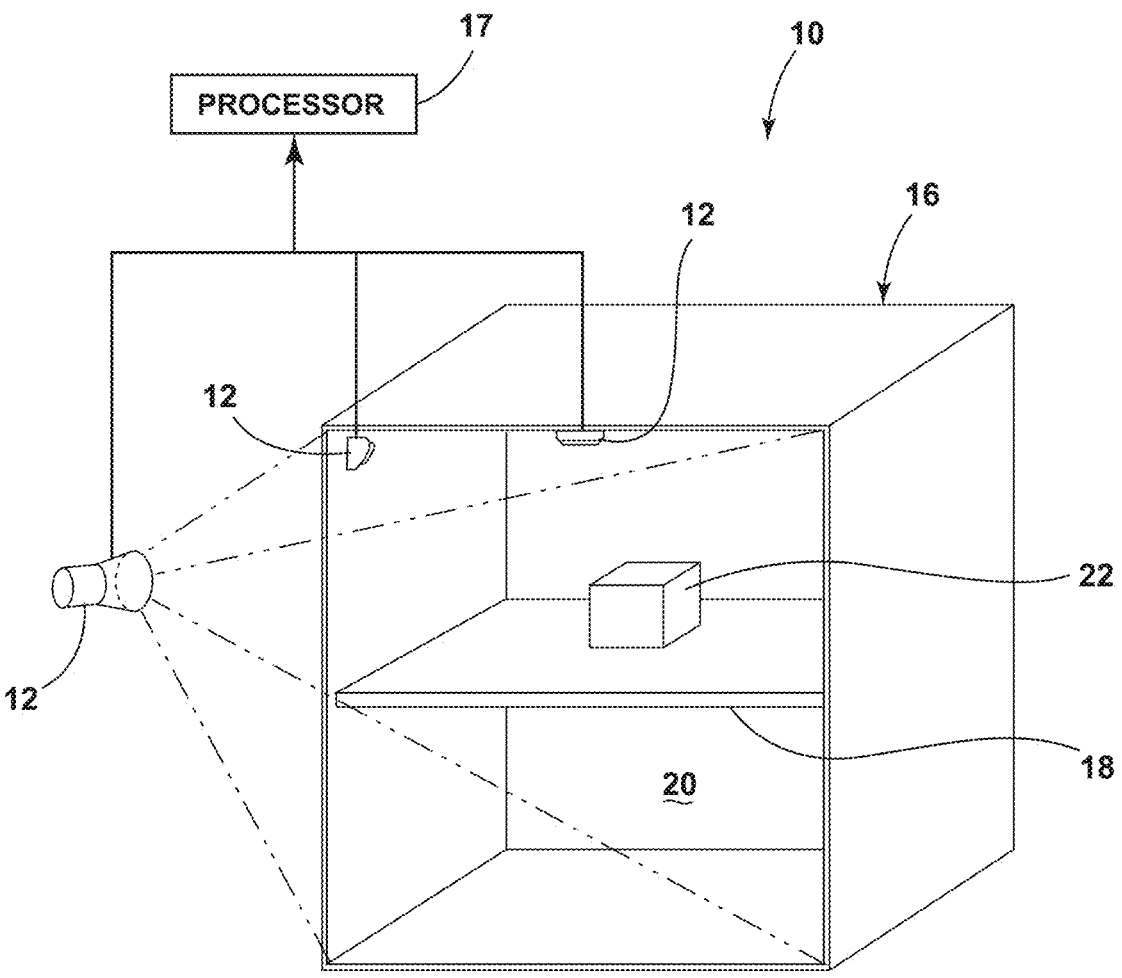
FIG. 1 is a front perspective view of an image processing system monitoring a cavity of an appliance according to one aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to image processing for an appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring generally to the figures, an image processing system 10 of the present disclosure provides for an enhanced user experience of operating a kitchen device. For example, and as will be further described herein, the system 10 may enhance an experience of operating a cooking appliance, an experience of operating a dishwasher appliance, an experience of operating an inventory management device, or another interactive experience with kitchen equipment. The system 10 may employ a camera 12 or other imaging device 12 to capture an initial image 14 of the contents of an appliance 16, such as an oven, a range, a refrigerator, a dishwasher, a freezer, or another appliance 16 having an inner compartment. An image processor 17 processes the initial image 14 to generate a spatial mapping of an interior 20 of the appliance 16. For example, the image processor 17 may detect a location of one or more support members 18 in the interior 20 to generate a target view of the interior/cavity 20 and/or to generate a consistent and useful view of an item 22 in the interior 20, such as a food or a dish. As will be further described herein, the image processor 17 may employ various image processing techniques, such as applying a histogram of gradients 23 (HOG) to the initial image 14, to achieve the modified views of the interior 20 and/or attain the spatial mapping. Proper dimensions of the contents of the cavity 20 may therefore be captured and allow for item recognition/classification functions (e.g., distinguishing between a chicken and a turkey). These features of the image processing system 10 may be independent of one another or may build upon each other, such that a result of one of these features (e.g., support member detection) may be utilized as one basis for another of these functions (e.g., image enhancement or image manipulation).

In general, the image processing system 10 of the present disclosure may provide for a more effective way of generating useful images or views of the contents of the interior 20 of the appliance 16. By providing consistent and clear views of objects 22 (e.g., food, dishes, vessels, etc.), the processing techniques may allow users to compare the status of cooking, cleaning, or storage operations of the appliance 16 to target states for the objects 22. In addition, the dynamic and adaptive operation of the present processing system 10 may enhance the experience of the user by allowing for any number of imager angles or positions that allow for capturing the initial images 14 of the cavity 20 of the appliance 16. Further, the system 10 may implement additional or alternative imaging devices (e.g., a mobile device 26) to allow for remote imaging of the interior 20 by a user 28 to provide for flexibility in implementation. In this way, the present system 10 may be incorporated into a legacy appliance.

The present image processing system 10 may further provide for a shared experience of operating a kitchen appliance by allowing different users from remote locations to compare cooking, cleaning, or food storage operations between two separate geographical regions. For example, the system 10 may be configured to compare images of a first cooking cavity at one location to an image of a second cooking cavity or to a different acquired image (e.g., a picture taken by a camera, an internet picture, a picture taken from a book or from a newspaper), in order to enhance live instructional communication of how to cook a particular food. The image processing techniques may allow a viewing angle of the first cooking cavity to match a viewing angle of the second cooking cavity to allow for effective comparison of the contents of the first and second cooking cavities. In other examples, pictures of food items stored in a refrigeration device may be compared to other acquired or generated images of those food items in a fresh state or another target state, as will be described further herein.

In general, the present system 10 may achieve two comparable images that, from the view as originally captured, would otherwise be challenging to compare. By standardizing a target perspective, the imager angle and position of the objects in the cavity 20 may have less influence over the quality of estimation for various kitchen operations (e.g., inventory management, space optimization, cleanliness detection, etc.) than methods that do not incorporate image manipulation. The standardization of the view of the contents may further provide for robust machine learning models by training such models on consistent images. For example, a dataset for training an exemplary machine learning model may include a plurality of top-down images of different foods in a cooking cavity, with the exemplary machine learning model being trained to detect patterns in various food dishes, such as a color distribution, a shape, a degree of light reflection, or other visible distinctions. The exemplary machine learning models may thus incorporate any number of depth estimation, geometric shape recognition, edge-detection, and/or color pattern recognition models that may be trained with a common view (e.g., a top-down view) to estimate an identity or a state of the object 22 in the cavity 20. In this way, AI-based reference image sets may more easily be populated for comparison to determine a status of the contents of the cavity 20.

Figure 2:
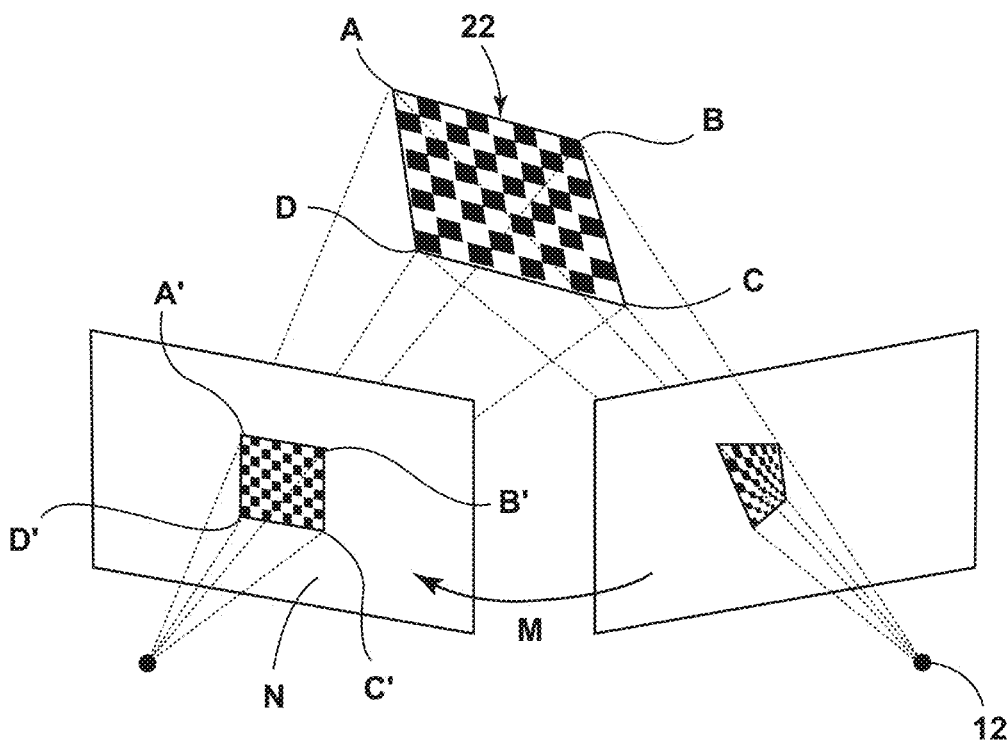
FIG. 2 is a demonstration of a perspective normalization feature employed with a transformation matrix according to one aspect of the present disclosure.

Referring now more particularly to FIG. 2, a normalization operation for images captured by the imaging device 12 may employ a homography projection matrix M to transform the initial view image 14 to a target view plane P that is parallel to an opening of the cavity 20. The target view plane P may have a target viewing angle having an inclined view, another perspective view, a top-down view, a side-view, or another view pre-defined by the image processor 17 or selected by the user 28. The particular matrix M employed or selected by the processor 17, may be dependent on the location, or level, of the support structure 18 in the interior 20, such that a different transformation matrix M may be employed for each level or location of the support structures 18. Although the object 22 illustrated in FIG. 2 is a chessboard, various objects 22 may be employed to train or program the transformation matrix M to consistently allow normalization of the initial view image 14 for each position of the support structure 18. In the example illustrated, corner points A, B, C, D of the object or chessboard 22 taken from a corner-angle camera 12 are captured, and corresponding corner points A', B', C', D' representing a square shape that corresponds to the shape of the object 22 from a normalized view N are generated. The transformation matrix M is then calculated to project the corner points A, B, C, D to the new corners A', B', C', D' of the square shape. As a result, the normalized view N of the object 22 is produced and presentable to the user 28 or for further processing techniques related to enhancing an experience of using the kitchen appliance 16.

The above process may be applied to cookware, food containers, food items, dishes, or other similar items disposed in the interior 20 of any one of the appliances 16 of the present disclosure. Further, the transformation matrices M employed may correspond to positions, in 3-dimensional space, of the imaging device(s) 12. Thus, the particular matrix M utilized for transforming the initial image 14 (e.g., normalization) may depend on the position of the support structure 18 in the interior 20, as well as the position of the imaging device 12 relative to the support structure 18 or the object 22. As will be described further herein, by identifying a position of the support member 18, the position of the object 22 in the interior 20 relative to the imaging device 12 may be determined thereby allowing production of clear images of the object 22 after normalization. In some examples, by using pre-defined position data corresponding to known positions for the support member 18, image normalization may require less processing time for estimating accurate pixel data.

Figure 3:
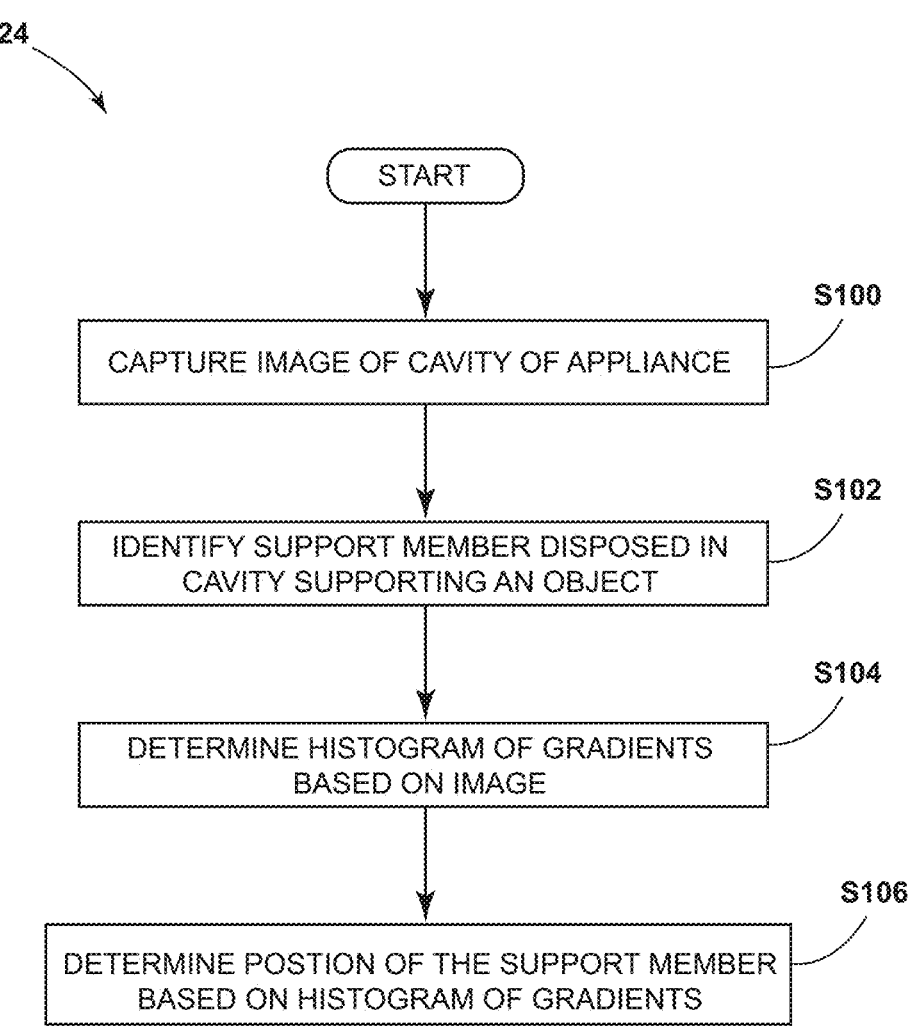
FIG. 3 is an image processing method according to one aspect of the present disclosure.

Referring now to FIG. 3, an image processing method 24 for the appliance 16 includes capturing, via at least one imaging device 12, the initial image 14 of the cavity 20 of the appliance 16 at step S100. At step S102, the support member 18 disposed in the cavity 20 supporting an object 22 is identified based on the initial image 14 via the image processor 17. For example, the object 22 may be a food item 40 or dishware 42. A histogram of gradients 23 is determined or calculated based on the initial image 14 at step S104. At step S106, a position of the support member 18 is determined based on the histogram of gradients 23.

The method 24 may also, or alternatively, include image transformation via normalizing the initial image 14 based on the histogram of gradients 23. The resulting modified image may be a top-down view, an inclined view, or any other oblique view, side view, or orthographic target view for the object 22 as determined by the user 28 or a software application. Normalization may refer to adjustment of the initial image 14 with respect to a reference standard or respect to a reference image, including the normalization of the brightness/color/saturation spectra. Normalization with respect to a reference image should be understood as detecting, from the reference image, reference data such as orientation, perspective, level of magnitude/scaling of details, brightness/color/saturation spectra equalization, objects in the initial image 14, and rearranging the captured image to the reference data. Such normalized data are given in input to learnings models together with the reference image and reference data for object recognitions and optionally for food doneness detection, spoilage detection, cleanliness detection, and other similar state determination models.

As will further be described herein, obstructions in the initial image data may be cropped from the normalized image and replaced with smoothed pixel data that blends the image 14 of the object 22. The obstructions may include condensation, grease, smoke, another support member, or any other optical interference of the object 22. Based on the re-oriented, final image of the object 22, various statuses of the object 22 may be determined. For example, a level of cleanliness of a dish, a level of food doneness, a level of spoilage of the food item 40, or the like may be determined based on the final image. In addition, the final image may be utilized by the user 28 to compare images 14 of food items 40 having a target cooked state, dishes having a target clean state, food items 40 having a target fresh state, or the like to provide the user 28 with more information to make an informed decision for what cooking, cleaning, or food storage operations should be performed.

Still referring to FIG. 3, the method 24 may further include determining a position of the at least one imaging device 12 and/or objects 22 in the cavity 20 based on the histogram of gradients 23. For example, as will be further described herein, patterns of pixel data in the initial images 14 may be correlated to projection angles or a perspective convergence point to determine the spatial mapping of the interior 20. The position of the imaging device 12 may also, or alternatively, be determined based further on known historical heights or positions of the support members 18. In other examples, neural networks trained to detect a viewing angle of the imaging device 12 based on vanishing points, convergence lines, known proportions, or other known features of the appliance 16 may be employed to allow transformation to a target viewing angle. In this way, a reverse operational mode of the system 10 in which the position of the imaging device 12 is not pre-configured (e.g., the imaging device 12 is not mounted to a known position) may be implemented to determine the position of the imaging device 12 and, thus, the initial viewing angle.

Figures 4A, 4B, 4C:
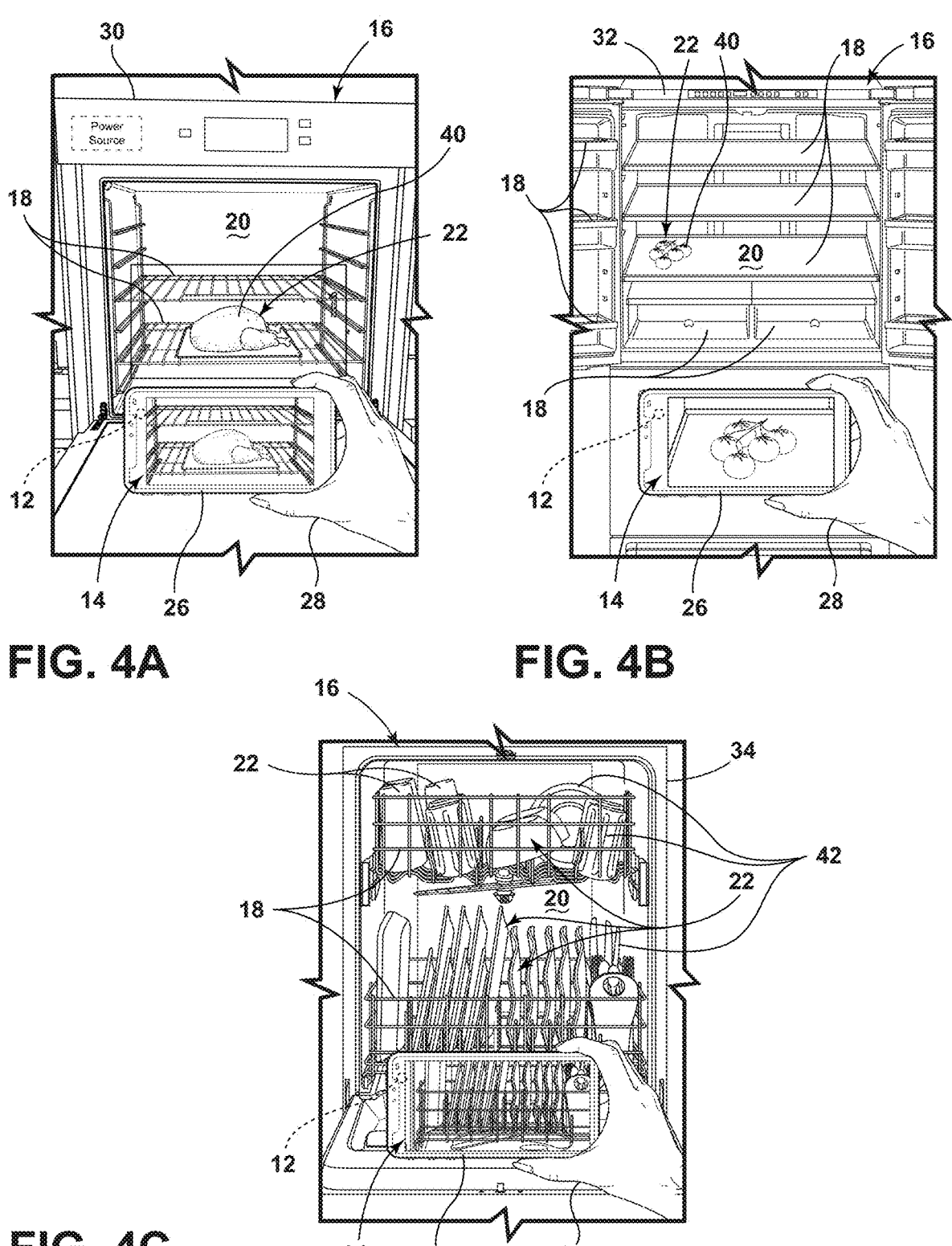
FIGS. 4A-4C are perspective views of an image processing system employed with a variety of appliances.

Referring now to FIGS. 4A-4C, various examples of the image processing system 10 are presented in operation with a cooking device 30 (FIG. 4A), a food storage device 32 (FIG. 4B), and a washing device 34 (FIG. 4C). In each example, the imaging device 12 may be incorporated with the appliance 16 or be separate from the appliance 16, such as in the case of the camera 12 of the mobile device 26. For example, the user 28 may employ the camera 12 of the mobile device 26 to capture video data or images 14 of the interior 20. The present image processing algorithms may be executed via a software application running on the mobile device 26 (or remotely) and be configured to manipulate or adjust the image/video data in order to provide consistent viewing angles of the items 22 in the interior 20. For example, the software application may analyze the image/ video data to detect the food item 40 in the cooking device 30, a food in the food storage device 32, and/or a dish in the washing device 34. The detection of the item(s) 22 in the interior 20 may be accomplished via normalization to a pre-defined view, cropping functions, neural-network processing techniques, and/or other image-processing features further described herein.

Referring now to FIGS. 5-9, one example of the present image processing techniques includes determining a viewing angle and/or a position of the imaging device 12 relative to the appliance 16. For example, the viewing angle detection algorithm may also provide a distance between the imaging device 12 from the cavity 20. The viewing angle detection algorithm may be employed by the image processor 17 prior to image normalization to the target view. Unlike examples in which the position of the imaging device 12 is pre-configured and/or preprogrammed in the image processor 17 (e.g., the camera 12 being mounted to a known position on the appliance 16), in this example, the image processor 17 may utilize the histogram of gradients (HOG) 23 and/or neural networks to determine the position of the imaging device 12. In some instances, the image processor 17 is configured to access computer-aided drawing (CAD) data of the appliance 16 and compare the initial image 14 to various views of the CAD of the appliance 16. Accordingly, the image processor 17 may first identify the type and/or model of the kitchen device by recognizing identification features of the appliance 16, as will be described herein. Although the present example is described with respect to a cooking appliance 30, the present viewing angle detection algorithm may be employed for any kitchen appliance described herein (e.g., a refrigerator 32, a dishwasher 34, etc.).

With particular reference to FIG. 5, the imaging device 12 may be the camera 12 of the mobile device 26 in this example. The camera 12 may have a field of view FOV that includes the initial view of the appliance 16. In the present example, the imaging device 12 is disposed to the right of and is disposed at a similar height as the cavity 20 of the appliance 16. In this example, the camera 12 is oriented at a perspective view. As illustrated in FIG. 6, the initial image 14 captured by the imaging device 12 includes the support member 18 in the oven 30. Because the coordinates (X, Y, Z) of the imaging device 12 relative to the cavity 20, or a plane that defines the opening of the cavity 20, are not initially defined by the image processor 17, the viewing angle, viewing orientation, and/or the coordinates of the imaging device 12 may be determined prior to performing the support member detection algorithm.

Referring now to FIG. 6, the initial image 14 may include identification features for the appliance 16. For example, edge detection techniques and/or landmark analysis employed by the system 10 may allow edges 35a, 35b, 35c of an opening of the cavity 20 to be identified by the image processor 17. The ratio or proportion of the lengths or angles of the edges 35a, 35b, 35c may allow the image processor 17 to identify the type of appliance 16, the particular model of the appliance 16, and/or another identifying aspect of the appliance 16. For example, the HOG 23 (FIG. 7) may allow for identification of control knobs on the appliance 16, and the image processor 17 may determine that the appliance 16 is an oven by comparing the identification features to known features stored in the CAD data or a database of image data of the appliance 16. These examples are nonlimiting, as any identification feature that may be revealed by the present image processing techniques may be utilized for comparison to known dimensions or proportions in the CAD data. For example, the known features may include dimension data for a plurality of different appliances. From the known features, the viewing angle may be extracted based on expected distortion of the known features, as will be described herein.

In an exemplary operation depicted in FIG. 7, the histogram of gradients 23 may be calculated for the initial image 14 to allow the image processor 17 to identify the edges 35a, 35b, 35c on the appliance 16, such as a top edge 35a, side edges 35b, and a bottom edge 35c of the opening of the cavity 20. Once the edges 35a, 35b, 35c are identified, the orientation of the edges 35a, 35b, 35c may be compared to determine one or more vanishing points VP in the initial image 14. For example, the top and bottom edges 35a, 35c of the opening may appear to converge at the vanishing point VP estimated by the image processor 17. Relative angles of the edges 35a, 35b, 35c (e.g., angles between the side edges 35b and the top and bottom edges 35a, 35c) may be calculated by the image processor 17 and employed for comparison to known features. For example, the known features may be a shape, an orientation, a proportion, a distance, or another dimensional property of the appliance 16. In the present example, the identification feature may be the opening of the cavity 20. For example, the known features, including the shape of the opening (e.g., rectangular), a proportion of the height of the cavity 20 compared to the width of the cavity 20, and/or other identification features in or around the cavity 20 that may limit the identity of the appliance 16 captured in the initial image 14.

In one example, detection of the opening by the image processor 17 may eliminate the possibility of the appliance 16 being a dishwasher, a refrigerator, or a non-appliance structure, such as a cabinet. Further, a support rack 36 in the cavity 20 may serve as an identification feature that the appliance 16 is an oven or another cooking appliance 30. It is contemplated that, although the identification features in the present example may be the edges 35a, 35b, 35c of the opening of the cavity 20, other identification features that may limit the identity of potential appliances 16, including a particular model of an appliance.

Continuing with the present example illustrated in FIGS. 5-7, the slope of the edges 35a, 35b, 35c detected in the histogram of gradients 23 may be calculated by the image processor 17. The image processor 17 may calculate a horizontal distance (e.g., X and Y coordinates) between the imaging device 12 and the opening based on the slopes of the edges 35a, 35b, 35c. The height, or Z coordinate, of the imaging device 12 relative to the opening may be calculated based on the relative slopes of, for example, the top and bottom edges 35a, 35c relative to the side edges 35b. For example, because a top edge 35a extends at a shallower angle than the bottom edge 35c extends relative to the side edges 35b, the image processor 17 may determine that the imaging device 12 is positioned closer to the top edge 35a than the bottom edge 35c.

Once the appliance 16 is identified, the HOG 23 may be compared to image data stored in a database (such as the remote databases 104, 106 that will be later described herein). The image data may include dimensional data of the appliance 16, including heights, widths, depths, proportions, and/or other various spatial information, which may be accessed by the image processor 17 for comparisons to the HOG 23. For example, gradients of the HOG 23 (described in detail with respect to FIGS. 11A-12C) may be measured to estimate lengths of the edges 35a, 35b, 35c and/or the proportions of the edges 35a, 35b, 35c. The image processor 17 may then compare the estimations to known measurements and/or proportions of a plurality of appliances and/or models of an appliance. Based on the comparison of the identification features to known proportions of various models or types of appliances, the image processor 17 may determine the viewing angle of the imaging device 12 and/or the position of the imaging device 12. For example, the image processor 17 may compare the angle of the top and bottom edges 35*a*, 35*c* to the side edges 35*b* to an expected angle from a front view of the top and bottom edges 35*a*, 35*c* to the side edges 35*b* (e.g., a 90° angle) to determine what the actual lengths of the top and bottom edges 35*a*, 35*c* are. Continuing with this example, the trapezoidal shape of the opening as captured in the initial image 14 may be compared to the actual dimensions of the opening according to the stored image data (e.g., rectangular) to estimate the viewing angle and distance from the appliance 16.

In other examples, the user may manually select a particular model of an appliance that corresponds to the appliance 16 captured in the image 14. Thus, a user selection may be received by the image processor 17 indicating the model. Similarly, the user may manually enter or select the approximate viewing angle and/or position of the imaging device 12 relative to the opening. In yet other examples, the combination of detecting a range of appliances by the image processor 17 is employed in combination with the user selection. For example, the image processor 17 may identify the appliance 16 as an oven or another cooking appliance 30 and present selections to the user 28 on the mobile device 26 to select one model of a plurality of models of the appliance 16. Accordingly, determining the identity of the appliance 16 may be performed automatically or manually.

The position and/or the viewing angle of the imaging device 12 relative to the opening may be computed or estimated by a neural network trained to determine the viewing angle of the cavity 20. For example, as will be discussed below in reference to FIG. 9, a convolutional neural network and/or a generative adversarial network (GAN) may be employed by the image processing system 10 to determine the viewing angle and/or viewing distance of the imaging device 12 relative to the opening of the cavity 20. These neural networks may be trained based on images of a plurality of appliances from a plurality of viewing angles for each appliance 16. Accordingly, the previously described process of using CAD data and the histogram of gradients 23 of the initial image 14 to approximate the viewing angle may be performed by the neural network.

Figures 8, 9:
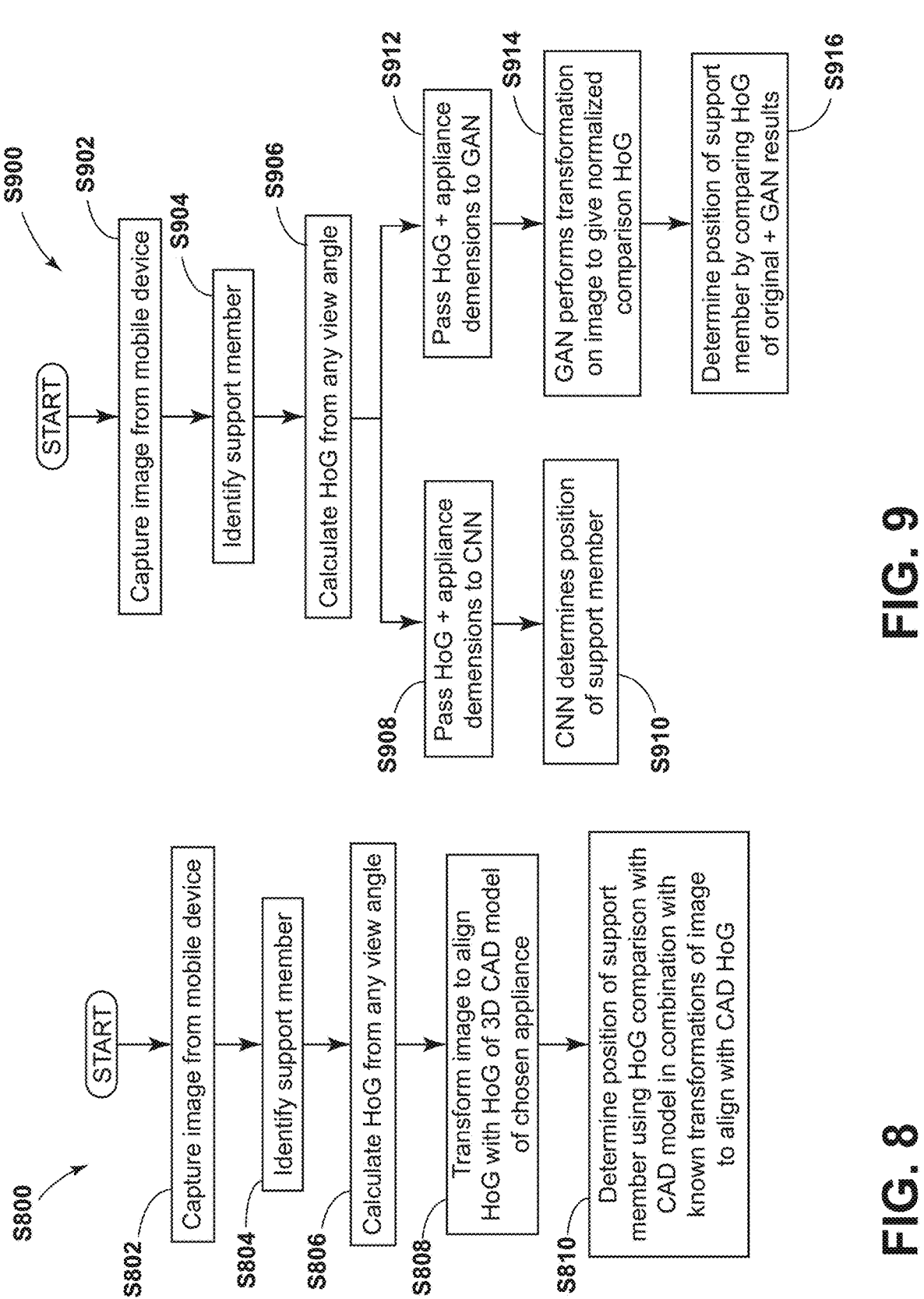
FIG. 8 is an image processing method according to one aspect of the present disclosure.
FIG. 9 is an image processing method according to one aspect of the present disclosure.

Referring now to FIG. 8, a method S800 for processing images 14 of an appliance 16 includes capturing the initial image 14 from the mobile device 26 at step S802. For example, the initial image 14 may be captured having an unknown or non-predefined viewing angle and may capture the cavity 20 of the appliance 16. At step S804, the method S800 may include identifying the support member 18 in the cavity 20. For example, the image processor 17 may employ edge detections or other image processing techniques, such as applying the HOG 23 to determine the presence of a support member 18 in the cavity 20. In one example of a refrigerator, the image processor 17 may identify objects 22 in the cavity 20 resting on a surface and determine the surface as the support member 18. In another example of an oven, the image processor 17 may identify food in the cavity 20 resting on the support rack 36. At step S806, the method S800 includes calculating a histogram of gradients 23 from the viewing angle of the mobile device 26. The particular steps of calculating the HOG 23 will be shown and described further herein in reference to the proceeding figures.

At step S808, the method S800 includes transforming the initial image 14 of the HOG 23 to align the HOG 23 with a view of the appliance 16. For example, the HOG 23 may be transformed to align with a three-dimensional CAD model of the appliance 16. The HOG 23 of the CAD model may be referred to as a ground truth histogram of gradients. For example, the ground truth histogram of gradients may be based on a three-dimensional computer-aided drawing model of the appliance 16 captured in the initial image 14. The CAD model may include the dimensional data of the appliance 16, such as the proportions, measurements, or shapes of the identification features of the appliance 16 previously described. The image processor 17 may determine a particular transformation for the HOG 23 to align with the model/the ground truth HOG. The viewing angle/distance in the CAD model that most closely aligns with the histogram of gradients 23 of the initial image 14 may be determined by the image processor 17. The relative transformation from a target view of the appliance 16 to the actual viewing angle of the appliance 16 may then be determined by the image processor 17.

The method further includes determining the position of the support member 18 in the cavity 20 based on a comparison of a transformed histogram of gradients 23 (e.g., the HOG 23 from the target view) to the dimensional data, which may include a ground truth histogram of gradients for each configuration of the support members 18 in the cavity 20, at step S810. For example, as will be described herein with respect to the proceeding figures (e.g., FIGS. 11A-12C), ground truth HOGs of the support members 18 may be compared at various heights for the support member 18 in the appliance 16 to determine the particular height level of the support member 18. In this way, the method S800 may be used for both normalizing the initial image 14 and determining the position of the support member 18.

Referring now to FIG. 9, a method S900 for processing images 14 of an appliance may include utilization of one or more neural networks configured to/trained to transform an initial view of the cavity 20 to the target view of the cavity 20 to determine the position of the support member 18 in the cavity 20. The method S900 may include substantially the same steps as S802-S806, such as capturing the initial image 14 from a mobile device 26 at S902, identifying the support member 18 at S904, and calculating the HOG 23 at S906. Following generation of the HOG 23, the method S900 may proceed with passing the HOG 23 into and the dimensional data (e.g., based on the identity of the appliance 16) into a neural network. For example, a convolutional neural network (CNN) may be provided at step S908, and the CNN may determine the position of the support member 18 at step S910 based on prior training to detect heights and/or positions of support members 18 in the cavity 20.

Alternatively, at step S912, the method S900 includes passing the histogram of gradients 23 and the dimensional data into a generative adversarial network (GAN). The GAN may be trained based on real images of many appliances 16 taken from a multitude of viewing angles. Further, the GAN may be configured to generate images based on the real images to provide a more voluminous dataset for training the GAN to detect the viewing angle. The real and generated image sets may allow the GAN to be trained to generalize features in the initial image 14 to determine the viewing angle, such as by ignoring obstructions in the initial image 14 and or the HOG 23 that are not relevant to the viewing angle. At step S914, the method S900 includes transforming the initial image 14, or the HOG 23, to the ground truth HOG. In this way, a training view, or target view, for the GAN may serve as an intermediate step for determining the viewing angle and/or coordinates of the imaging device 12. For example, the GAN may be trained to transform any image 14 of the cavity 20 having any viewing position to a front view of the opening. At step S916, the method S900 includes determining the position of support member 18 by comparing the histogram of gradients 23 of the initial image 14 to the ground truth HOG in the GAN. For example, and as will be described in reference to the proceeding figures (e.g., FIGS. 11A-12C) the system 10 may generate a plurality of ground truth HOGs for comparison to the HOG 23 with the training view. One ground truth HOG corresponding to each potential position for the support member 18 in the cavity 20 may be generated, with the ground truth HOG that most closely correlates with or aligns with the HOG 23 of the initial image 14 selected and/or determined by the image processor 17 to thereby result in the determined position of the support member 18.

In some examples, the GAN is configured to receive an array vector representation of the HOG 23 to determine the proper transformation to the training view or the target view. For example, the GAN may output a new HOG based on an image (e.g., the initial image 14 or the HOG 23) or a non-image data element. In either example, the GAN is trained to modify the initial view to the target view (e.g., perform normalization) to allow for determining the position of the support member 18.

Referring now to FIGS. 10-14, the image processing system 10 is exemplarily utilized with a cooking appliance 30. In this example, the support member 18 previously described is the support rack 36, and the cavity 20 is a cooking cavity 38 for receiving one or more food items 40 and/or dishware 42. The image processing system 10 is configured to execute an automatic rack level detection algorithm to identify a position of the rack 36 in the cooking cavity 38, as will further be described in reference to FIGS. 11A-12C. By detecting the position of the rack 36 in the cooking cavity 38, a position of the food item 40 in the interior 20 may be determined or inferred and a recommended or automatically controlled cooking cycle may be adjusted based on the determined location of the food item 40. Further, by identifying the location of the rack 36, the automatic rack level detection routine may aid in controlling a pyrolytic heating cycle (or another heating operation) for self-cleaning of the cooking appliance 30 (e.g., preventing a self-cleaning cycle or allowing a self-cleaning cycle based on the presence and/or location of the rack 36). Detection of the position of the rack 36 may also provide for more accurate renderings of the interior 20 when performing a normalization function on the initial image 14 of the interior 20. For example, proper proportions and/or scaling of a top-down image of the interior 20 generated from a perspective view of the interior 20 may result if the rack 36 level is properly identified.

The image processing system 10 may also provide for a normalization function for the cooking appliance 30. For example, the dimensions of the cooking cavity 38 may be determined for transposing the initial images 14 to a predetermined perspective view, as previously described with respect to FIGS. 5-9. In this way, the system 10 may normalize the dimensions according to the pre-determined perspective view. The perspective normalization function may provide a consistent top-down view, plan view, or other target view of the interior 20, which may be generated based on another view of the interior 20 taken by the same camera, an additional camera embedded in the same oven, or taken through an imager of a mobile device 26. In this way, a position of the camera 12 or other imaging device may correspond to a more convenient location adjacent to or within the interior 20 while providing an advantage of viewing the food item 40 from a top-down perspective or from a pre-determined angled perspective. The perspective normalization function may also provide for a more consistent food recognition machine learning model, such that food identification and/or food doneness detection algorithms may be executed with accuracy. In this way, various models of similarly situated appliances having different camera positions may include food doneness detection and/or food identification algorithms that are trained based on a common set of image data.

Starting from the spatial mapping of the cooking cavity 38 and/or from the established spatial position of the items 22 within the cooking cavity 38, particularly food items, the size normalization function allows establishment of proper dimensions of such items 22 for a further item recognition/classification function. For example, the size of the items 22 located in a field of view may be determined based on a preconfigured or calibrated scale determined by comparing the proportion of the objects 22 in the cooking cavity 38. Based on the comparison of objects 22 having known proportions to objects 22 of unknown proportions, the system 10 may distinguish objects 22 with similar appearances but differing scales. For example, it may be possible to distinguish between a chicken and a turkey.

The image processing system 10 may also provide for an obstruction removal function for the cooking system. The obstruction removal function may employ various neural networks and other image processing techniques to digitally remove an image of the rack 36 that is disposed between the food item 40 and the camera 12 and serves as the occlusion/obstruction. For example, as will be further described in reference to FIG. 9, if the food item 40 is placed below the rack 36 and the camera 12 is mounted above the rack 36, the camera 12 may capture a blocked view of the food item 40. The obstruction caused by the racks 36 that may be remedied by the obstruction removal function may cause difficulties in identifying food and create an unpleasant presentation for the user 28 in monitoring the cooking process of the food item 40. The obstruction removal function may provide for a more accurate depiction of an unobscured top-down view of the food item 40 in the oven, which may allow for more accurate food doneness detection and/or food identification. In this way, food recognition may be improved and a more simplified training method may be employed to train models to identify food doneness and/or food identification.

Figure 10:
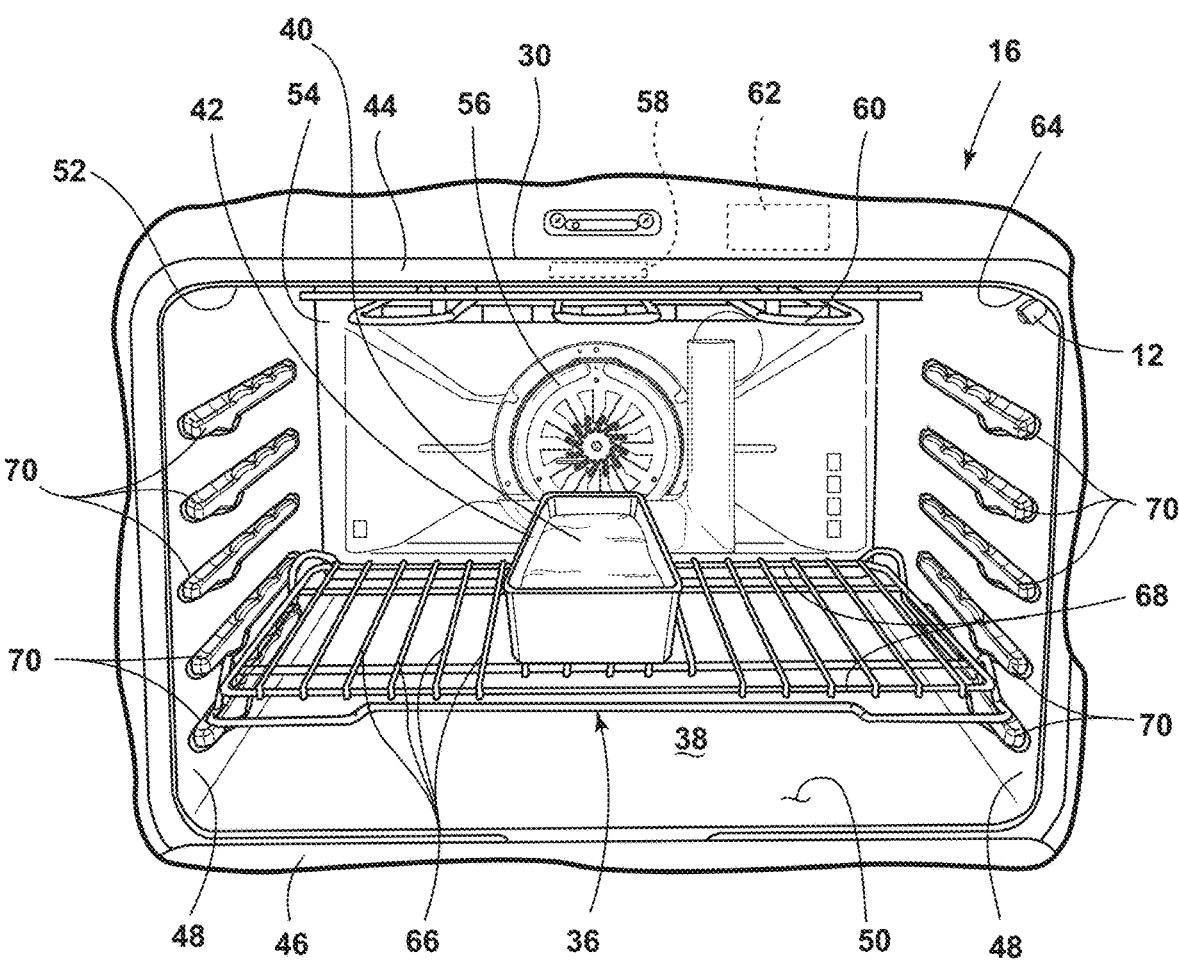
FIG. 10 is a front perspective view of a cooking cavity of a cooking appliance.

Referring now more particularly to FIG. 10, the cooking appliance 30 includes a housing 44 that defines the cooking cavity 38. The cooking cavity 38 is selectively accessible via a door 46 that is pivotable between a closed position and an open position. The cooking appliance 30 may include one of a microwave oven, a convection oven, a range, a toaster oven, or various cooking devices. The housing 44 may include a pair of sidewalls 48, a bottom wall 50 (e.g., a floor), a top wall 52, and a back wall 54. The cooking appliance 30 may include a fan 56 configured to circulate air in the cooking cavity 38 and an illumination source 58 configured to illuminate the cooking cavity 38. At least one heating element 60 may be disposed in the interior 20 and along the top wall 52 for heating the interior 20 based on a cooking cycle. The cooking appliance 30 includes a controller 62 that is configured to control the illumination source 58, the fan 56, the at least one heating element 60, and various other electronic devices (e.g., display) associated with the cooking appliance 30.

Because the heating element 60 may be positioned along the top wall 52, a top-down image 14 of the interior 20 may be challenging to attain directly (e.g., via an image sensor mounted directly above a center portion of the interior 20). For example, heat from the heating element 60, as well as physical space limitations, may require the camera 12 to be located elsewhere. In general, the camera 12 may be operably coupled with the housing 44 and be directed toward the cooking chamber to capture images 14 of the cooking cavity 38. Although positioned in a front upper right corner 64 of the housing 44 in the illustrated example, the camera 12 may be positioned in another peripheral location of the housing 44. For example, the camera 12 may be disposed along an upper central portion of the front or the back wall 54 or in any corner of the housing 44.

It is also contemplated that a plurality of cameras 12 may be provided for capturing different perspectives of the cooking cavity 38 (e.g., a stereoscopic arrangement). In some examples, the camera 12 is provided in/on the door 46 of the cooking appliance 30, such that when the door 46 is in the closed position, the camera 12 may capture an image 14 of the cooking cavity 38 from a perspective view. In other examples, the camera 12 is not mounted to the housing 44. For example, the camera 12 may be an imaging device of a smartphone or tablet as previously described.

Still referring to FIG. 10, the support rack 36 may be provided in the cooking cavity 38 for supporting the food item 40 thereon. The support rack 36 may include metal framing elements 66, 68, such as interlocking rods 66, 68 or wires. Each rod 66, 68 of the support rack 36 may extend along a central axis and may generally form a straight line shape from a first end of the rod 66, 68 to a second end of the rod 66, 68. The rods 66, 68 may include first rods 66 extending generally from a front of the housing 44 toward a back of the housing 44 and second rods 68 extending from one side of the housing 44 to another side of the housing 44. In some examples, the support rack 36 may include other geometries for the metal framing elements 66, 68 that may be consistent or form regular polygonal shapes that allow for image processing techniques of the present disclosure to be applied to effectively.

With continued reference to FIG. 10, the housing 44 may include a plurality of protrusions or rails 70 that extend from the front of the housing 44 toward the back of the housing 44 for supporting the support rack 36 from the sidewalls 48 of the housing 44. Each of the plurality rails 70 may be disposed at levels spaced along a height H (FIGS. 11A and 12A) defined between the bottom wall 50 of the housing 44 and each of the plurality of protrusions 70 in a direction normal to the bottom wall 50. In some examples, the plurality of protrusions 70 include a plurality of notches for the receiving the rack 36, such that the sidewalls 48 of the housing 44 support the rack 36 in the plurality notches. In some examples, the spacing and/or geometry of the rails 70 and/or racks 36 may serve as the identification features that allow the type or model of the cooking appliance 30 to be identified by the image processor 17 as previously described.

Figure 11A:
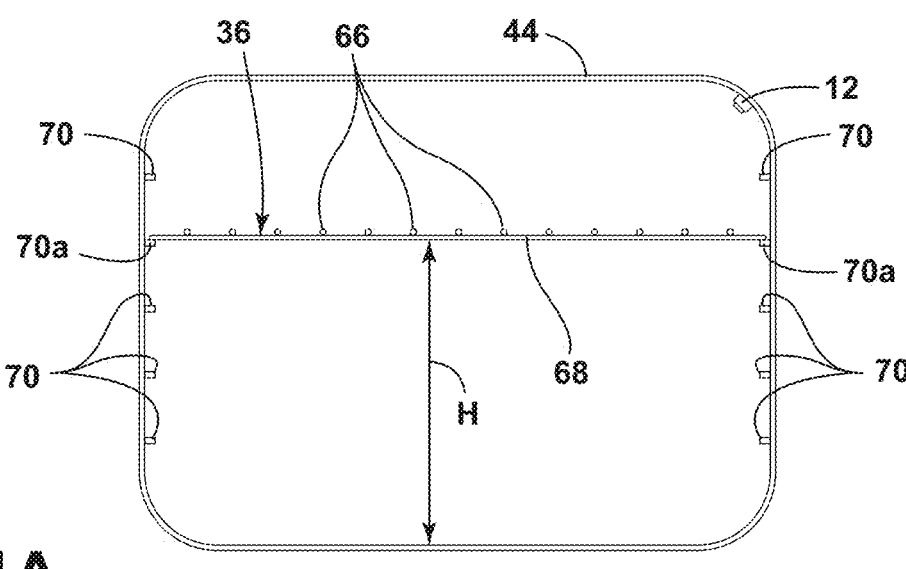
FIG. 11A is a front view of a cooking cavity with a support rack disposed in an upper position of the cooking cavity.

Referring now to FIGS. 11A-12C, the image processing techniques employed by the system 10 may be applied to various levels of the support racks 36. As exemplarily shown in FIGS. 11A and 12A, the plurality of protrusions 70 may include an upper rail 70a and a lower rail 70b. In FIG. 11A, the rack 36 is positioned on the upper rail 70a (e.g., at an upper position or upper level), and in FIG. 12A, the rack 36 is positioned on the lower rail 70b (e.g., at a lower position or lower level). As discussed in the following examples, the present image processing techniques may be implemented to identify the height H of the rack 36 by comparing images, or image data from images 14, of the cooking cavity 38 to ground-truth image data that corresponds to the rack 36 at various heights. For example, as previously described with respect to FIGS. 5-9, the image processor 17 may compare the HOG 23 of the rack 36 to ground truth HOGS for each level H for the racks 36 to determine the level H.

Figure 11B:
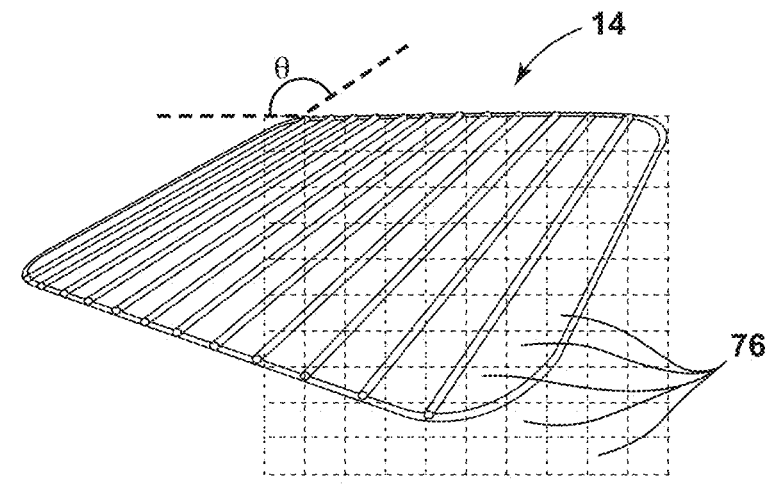
FIG. 11B is an exemplary image of an upper support rack captured by a camera positioned proximate to a corner of the cooking cavity.
Figures 12A, 12B, 12C:
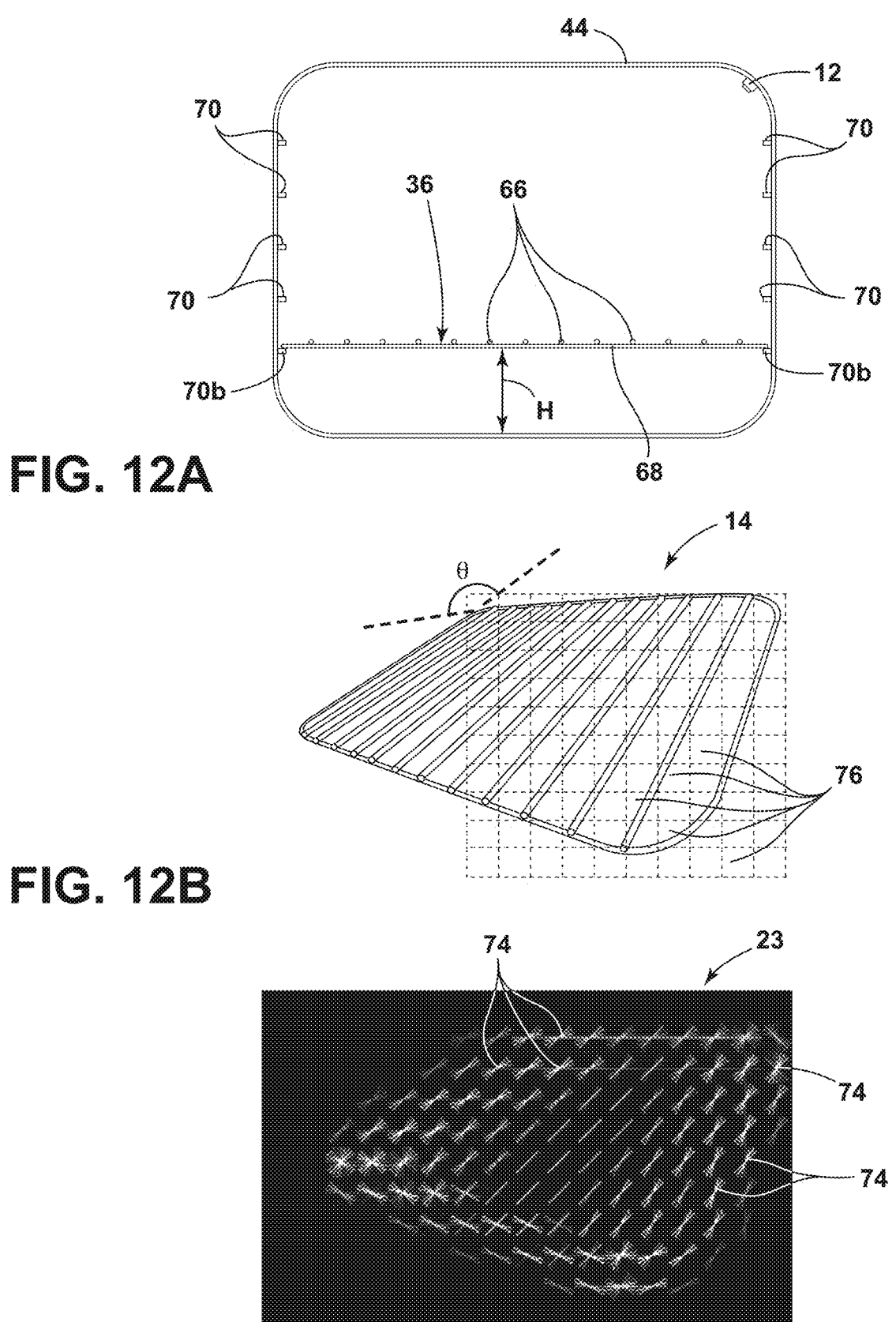
FIG. 12A is a front view of a cooking cavity with a support rack disposed in a lower position of the cooking cavity.
FIG. 12B is an exemplary image of a lower support rack captured by a camera positioned proximate to a corner of the cooking cavity.
FIG. 12C is a visual representation of a histogram of gradients generated based on the image of FIG. 12B.

Referring now to FIGS. 11B and 12B in greater detail, an exemplary image of the rack 36 from the perspective view of the front upper right corner 64 is illustrated, with FIG. 11B corresponding to the rack position of FIG. 11A and with FIG. 12B corresponding to the rack 36 position of FIG. 12A. As demonstrated by FIGS. 11B and 12B, a perspective image angle $\theta$ of the support rack 36 may be dependent on the position of the support rack 36 relative to the camera 12. For example, the camera 12 may not be oriented in a top-down configuration to demonstrate the plurality of first rods 66 being parallel with one another and the plurality of second rods 68 being parallel with one another. Accordingly, the orientation of the camera 12 relative to the cooking cavity 38 and the support racks 36 may result in the exemplary images 14 representing the parallel features to be skewed by the perspective image angle $\theta$ of the camera 12.

As shown, the plurality of rods 66, 68 appear to be non-parallel or converging at a perspective convergence point as a result of the perspective of the camera 12. The perspective image angle $\theta$ may be determined as an angle of the first rod 66 to an intersecting or connected/integrated second rod 68. As demonstrated in the differences between FIGS. 11B and 12B, the perspective image angle $\theta$ may differ depending on the location, level, or height H of the support rack 36. For example, as shown, the perspective image angle $\theta$ of the image 14 of the rack 36 in FIG. 11B may be less than the perspective image angle $\theta$ of the image 14 of the rack 36 of FIG. 12B taken at a common section of the support rack 36.

Figure 11C:
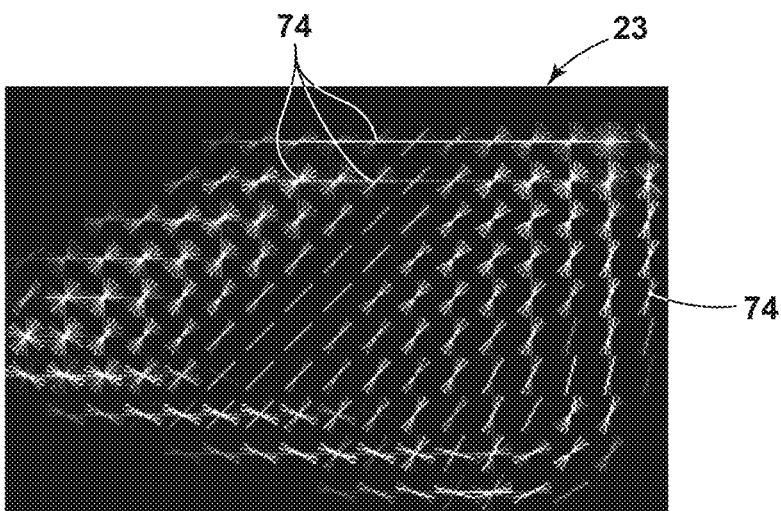
FIG. 11C is a visual representation of a histogram of gradients generated based on the image of FIG. 11B.

Referring now to FIGS. 11C and 12C, a histogram of gradients (HOG) 23 may be generated by the image processing system 10 of the present disclosure based on the initial images 14, as previously described. As illustrated, the HOG 23 summarizes the discrete data calculated based on interpretation of the initial images 14. The HOG 23 may comprise a plurality of gradients 74 each calculated for a portion of the initial image 14. For example, the initial image 14 may include a plurality of cells 76 that are segmented parts of the initial image 14, such as pre-defined areas of pixel data (e.g., 16 pixels by 9 pixels) in which one gradient 74 is calculated. For example, the plurality of gradients 74 may be determined based on analysis of pixel data within the initial images 14 to identify patterns of similar or different pixel values of the cells 76. As previously described, orientations of the first rods 66 and second rods 68 may be different for different levels H of the support rack 36. The result of such different levels H may result in different gradients 74 having different slopes in the initial image 14. Stated differently, the angle of the imaging device 12 relative to the cooking cavity 38, coupled with known orientations/ positions of the support racks 36, allow for different gradients 74 to be calculated by the processor 17 and compared to expected gradients for a given height H. For example, the ground truth HOG previously described with respect to FIGS. 5-9 for each rack level H may be employed for comparison to the actual HOG 23. The ground truth HOG that appears most proximate in number of pixels and/or angle of gradients 74 to the actual HOG 23 will be associated with a particular rack level H. Based on this comparison, which may involve determining a projection angle and/or viewing angles, the processor 17 may determine the rack level H.

In some examples, two sets of aligned gradients 74 may be identified for a single rod 66, 68, with one set of gradients 74 corresponding to an edge of the rod 66, 68 closest to the camera 12 and with the other set of one gradient 74 corresponding to the edge of the rod 66, 68 further from the camera 12. Thus, a slope (e.g., rise v. run) formed by the pixel data may correlate to a specific rack level for a given camera position. Each gradient 74 determined by the system 10 may include a corresponding orientation or angle which allows the system 10 to compare to gradients 74 captured from racks 36 at differing heights H. For example, the magnitude of the gradients 74 from each of the initial images 14 with the racks 36 at different levels H are represented by the line segments that intersect at a central axis of the rods 66, 68. As shown in FIGS. 11A-12C, the gradients 74 are aligned with the direction of the rods 66, 68 corresponding to the rack 36 at each of the respective heights H. In this way, patch areas, or the cells 76, of the initial image 14 of the rack 36 at a first height may have different gradients 74 than the cells 76 of another image of the rack 36 at a second height in a common region of each image 14.

Once the features of the HOG 23 are extracted from the initial image 14, the features may be compared to the known or predefined ground truth features (e.g., the ground truth HOG) corresponding to previously identified gradients 74 associated with the given rack level H. For example, the gradients 74 illustrated in FIG. 11A may be compared to known gradients 74 associated with the height H, or rack level H, when it is in the upper position identified in FIG. 11C. Comparing the identified gradients 74 to the known gradients 74 may include measuring a distance between the ground truth features and the features of the calculated gradients 74. The comparison may also include averaging a plurality of measurements between the identified gradients 74 and the ground truth features. Other statistical or logical deductive steps that allow the system 10 to identify the rack level H from a comparison of the identified gradients 74 and the ground truth features may also be implemented. After comparison of the HOG 23 to ground truth histograms/features, the image processing system 10 may identify the level H most closely associated with the subject HOG 23 and, in turn, may determine the level H of the rack 36.

The histogram of gradients (HOG) 23 employed in the present disclosure may be one particular example of the processing features used to determine the rack level H. As previously described, neural networks, such as a CNN or a GAN, may be trained to detect the position of the support rack 36 based on trained images of the cooking cavity 38 taken from predefined viewing angles. In some examples, the system 10 may employ scale-invariant feature transforms, speeded-up robust feature (SURF) detection, features from accelerated segment testing, local binary pattern detection, and/or a linear filtration for texture analysis (e.g., a Gabor filter). In some examples, these other image processing techniques are used in addition or in conjunction with the HOG 23 approach to determine the rack levels H. In some examples, a brightness normalization may be applied to the initial image 14 prior to feature extraction to mitigate the impact of different light sources (e.g., illumination source 58) applied for feature extraction. For example, the image processing system 10 may scale brightness values to cause dark pixels to approach or be made black and cause bright pixels to become brighter (e.g., whiter).

Although the example shown and described in FIGS. 11A-12C involves a corner-mounted camera 12, the approach described above is operable for any view of the interior 20 captured by the camera 12. For example, in a case in which the camera 12 is mounted midway along an outer part of the top wall 52 of the housing 44 adjacent the door 46, similar differences in gradient 74 may be identified by the system 10. In this way, the HOG 23 employed by the system 10 may be operable to detect different rack levels independent of the particular position of the camera 12. As previously described, the same result can be achieved by using images taken with a mobile picture device such as the mobile device 26 (e.g., a tablet, a camera, a phone). For example, the image processor 17 may access the CAD data and/or the neural networks previously described with respect to FIGS. 5-9 to re-orientate the view of the initial image 14 to a consistent target view.

As previously described, the initial image 14 captured from the mobile device 26 or other remote imaging device 12 having no pre-configured viewing angle may be employed to determine the viewing angle. In such an example, the processor 17 may determine the viewing angle by identifying a region in space where the imaging device 12 is positioned (see FIGS. 5-9). For example, the image processor 17 may employ a GAN, a CNN, and/or a CAD model that has dimensional data to normalize the initial image 14 to a target view. Landmark analysis, triangulation algorithms, and/or dimension calculations on pre-determined or pre-programmed features of the cooking device 30 in the field of view (e.g., the height level H of the support rack 36, a height and/or a width of an opening of the cooking cavity 38, etc.) may also be employed. For example, a location and direction of the plane P previously described with respect to FIG. 2 may be determined based on the orientation of the opening determined by the processor 17. In this example, the processor 17 may compare the angle of a top or a bottom edge of the opening to a side edge of the opening, to determine how far away, at what elevation, and at what orientation the imaging device 12 is positioned, as previously described with respect to the appliance 16 of FIG. 4.

The processor 17 may determine a center of a field of view of the imaging device 12, as well as the position of the imaging device 12 in space (e.g., X/Y/Z coordinates of the imaging device 12 relative to a center of the opening). As previously described with respect to an appliance generally 16, such identification features may be employed on any known items or objects of or around the cooking device 30 to determine the position of the imaging device 12 relative to the cooking cavity 38. By providing for the inverse operation (e.g., determining the position of the imaging device 12), the system 10 may determine a target position for other imaging devices (e.g., in a remote cooking instruction scenario) to allow for consistent imaging angles between one cooking environment and another cooking environment.

Figure 13:
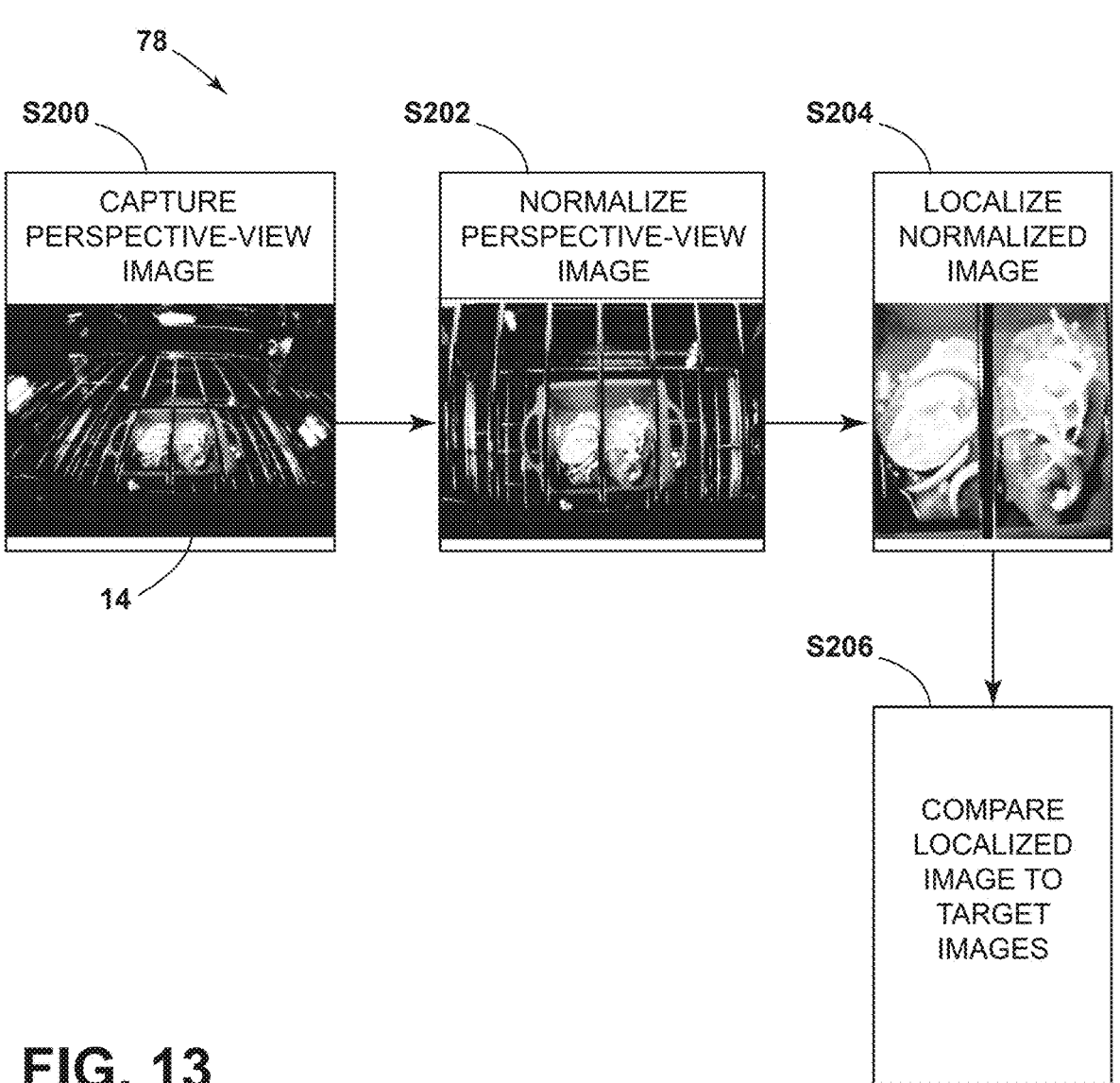
FIG. 13 is a block diagram of a perspective normalization feature according to one aspect of the present disclosure.

Referring now to FIG. 13, a first image manipulation process 78 is generally illustrated. A perspective frontal mounted camera 12 is exemplarily employed to capture a perspective view image of the interior 20 of the cooking appliance 30. Features previously described of the interior 20, such as the support racks 36, the sidewalls 48, the food item 40, a food dish, and other contents, are captured in the initial image 14 at step S200. After the perspective view image is captured, the system 10 may employ a normalization function to manipulate the image data identified in the initial image 14 to create a top-down view of the interior 20 at step S202. For example, the method 78 may employ the GAN, a CNN, or a CAD model, along with a HOG 23 of the cooking appliance 30 to transform the initial image 14 to a target view. Following normalization, the system 10 then localizes the image to focus on the food item 40 identified from the image data at step S204. For example, the image processor 17 may identify the food item 40 and/or dish 42 in the cooking cavity 38 and zoom, or magnify the region of the dish 42 or food item 40. At step S206, the localized image is compared to a target image of the same or similar type of food item 40 to determine a status of the food item 40. Through this process 58, the system 10 may present a preferred point of view from which one would look at the food item 40 to determine a food doneness level and/or to determine the identity of the food 40. It is contemplated that a perspective view is only one example of any initial view that may be used for the present image processing method 78.

The target images generated through the image manipulation process 78 may be provided across a plurality of models of cooking appliances 30, such as various models of ranges that have differing positions of cameras 12. For example, one model of a range may incorporate the camera 12 in the upper right corner 64 of the cooking cavity 38 and a second range model may incorporate the camera 12 along a different position of an upper portion of the range, thereby creating two different perspective images. In other examples, the camera 12 is positioned in the mobile device 26, and the position of the mobile device 26 determines the initial angle. The first image manipulation process 78 described herein may allow machine learning models and/or the GAN previously described to be trained on a common set of images 14 (e.g., top-down views) to allow for a more robust food identification or food doneness detection model.

The first image manipulation process 78 described above may be used in tandem with or otherwise in combination with the rack level detection algorithm previously described with respect to FIGS. 11A-12C. For example, once the rack level H is identified or determined based on the HOG 23 previously described, the system 10 may identify the particular transformation matrix M to apply to normalize the initial image 14 (FIG. 2). In this way, a more robust and accurate representation of the cooking cavity 38 of the oven may be generated and may be reliable to help determine a food doneness or an identity the food item 40.

Figure 14:
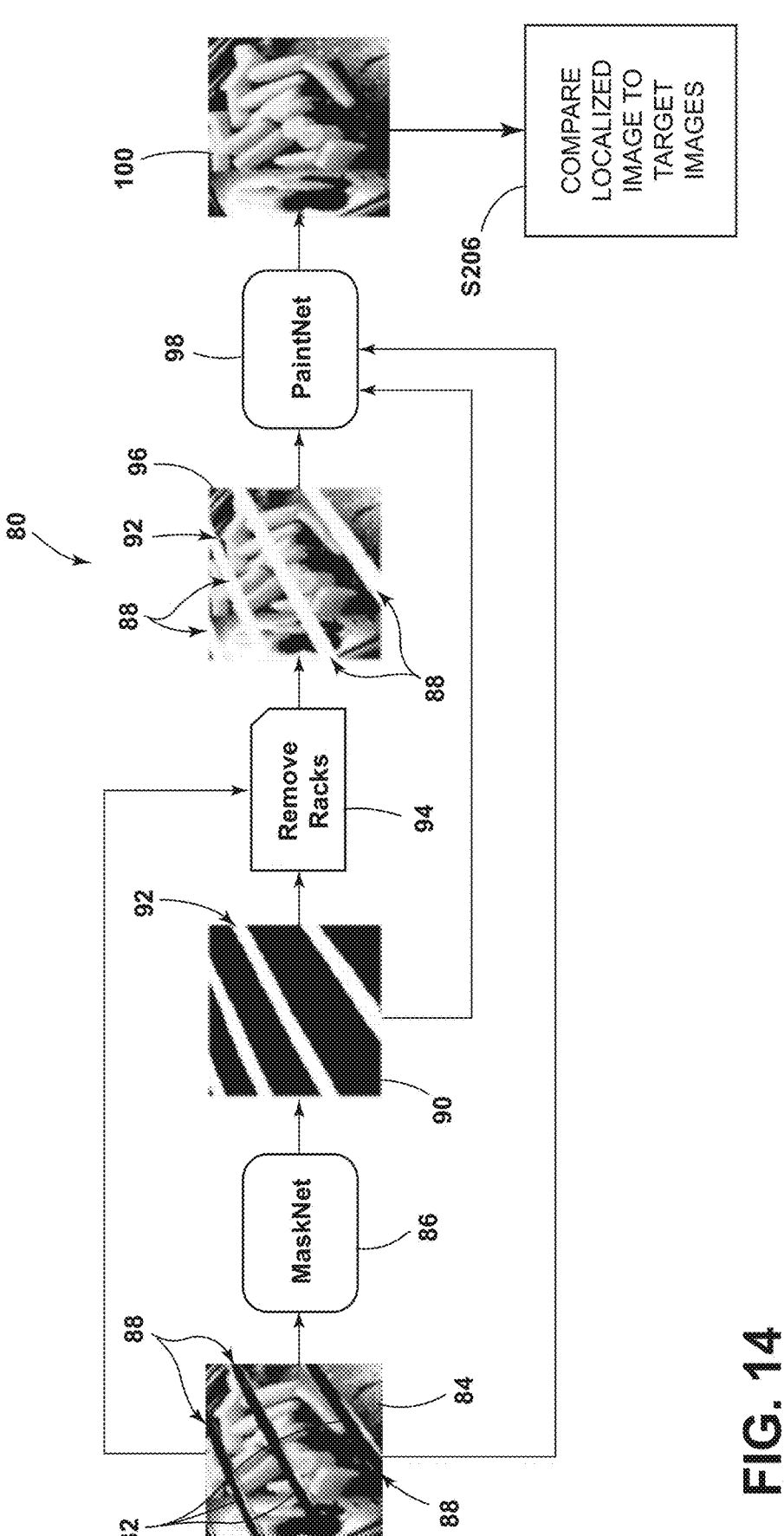
FIG. 14 is a flow diagram of a rack image removal and in-painting process according to one aspect of the present disclosure.

Referring now to FIG. 14, the system 10 may incorporate a second image manipulation process 80 that removes an obstruction 82, such as a representation of the support rack 36, from the target image or the initial image 14 (or a portion of the image 14) captured of the interior 20 of the cooking appliance 30. For example, the camera 12 previously described may capture a first image 84 that includes the occlusion 82 in the form of the support rack 36 overlaying the food item 40 in the image data. The first image 84 is then processed in a first machine learning model 86 that is trained to identify the location of one or more of the racks 36 in image data and create a mask to segment the racks 36 (e.g., rack regions 88) out of the image data. The first machine learning model 86 may incorporate a neural network deep learning model architecture, such as a convolutional neural network having encoders and/or decoders for semantic image segmentation. The convolutional neural network may be employed to segment out rack regions 88 as a mask. In general, the first machine learning model 86 is employed to first extract edge information from the image data using a plurality of filters (e.g., four filters). For example, Sobel and Laplacian filters may be applied to RGB-Y components of the first image 84 and concatenated with the first image 84 prior to being output to the neural network. In this way, the first machine learning model 86 is configured to output a second image 90 that is a binary mask 92 of the occlusions 82/rack regions 88.

The second image manipulation process 80 may further include a second machine learning model 94 that is configured to process the first image 84 and the second image 90 to remove the rack region 88 identified in the second image 90 from the first image 84. A resulting third image 96 is generated having pixel data associated with the rack regions 88 removed from the image data. The first, second, and third images 84, 90, 96 are then incorporated into a third machine learning model 98 that is trained to in-paint, cover up, cover over, fill in, or substitute the rack regions 88 with surrounding pixel data and produce an augmented image 100.

Still referring to FIG. 14, the third machine learning model 98 may apply Gaussian filtering to replace the rack regions 88 with smoothed versions of surrounding pixels. For example, the system 10 may determine pixel values surrounding or adjacent the rack regions 88, calculate target pixel values for the rack regions 88 based on the pixel values of the surrounding regions, and modify the portion of the image data to include the target pixel values for the rack regions 88. The pixel values may correspond to various color or intensity information representing the corresponding portions of a field of view of the camera 12 (e.g., chrominance, luminance, etc.). The Gaussian smoothing filter may be applied to the first and second images 84, 90, and an output of the Gaussian smoothing filter may be concatenated with the third image 96. The resulting concatenated data is then processed in a convolutional neural network that is trained to in-paint the rack regions 88 with the surrounding pixel data to produce a finalized image. The finalized image may be presented at a display, such as a human-machine interface (HMI) 130, the mobile device 26, and/or target images of the foot item 40 via the image processor 17 at step S206 as previously described.

Although described in relation to rack removal, in some examples, the obstruction 82 may be any object between the camera 12 and the object 22 that causes obstruction or distortion of a view of the object 22. For example, smoke particles, condensation, grease, or other food product residue may cloud the view of the object 22, and the image processor 17 may execute the obstruction removal process 80 to remove distorted portions of the image data (e.g., areas with hydration on a lens of the camera 12). The distorted portions may be identified by the first machine learning model 86 that is trained to identify the location of obstructions 82 in the image data and create the mask 92 to segment the obstruction 82. The in-painting processes may then be applied to the image data having distortions similar to the in-painting done for the rack removal process. In this way, the system 10 may account for water droplets, grease droplets, smoke particles, and other food product residue on the lens of the camera 12 or elsewhere in the cooking cavity 38 as a result of a cooking operation.

The second image manipulation process 80 described above may incorporate a training phase for the machine learning models 86, 94, 98 employed. The training may include utilizing reliable augmented images 100 generated based on images 14 of food obstructed from view by the racks 36 and the ground truth images of the rack 36. By using geometrically-augmented images 100 for training, the resulting machine learning models 86, 94, 98 may be trained more quickly and more cost-effectively than alternatives that do not include synthesized data sets.

Figure 15:
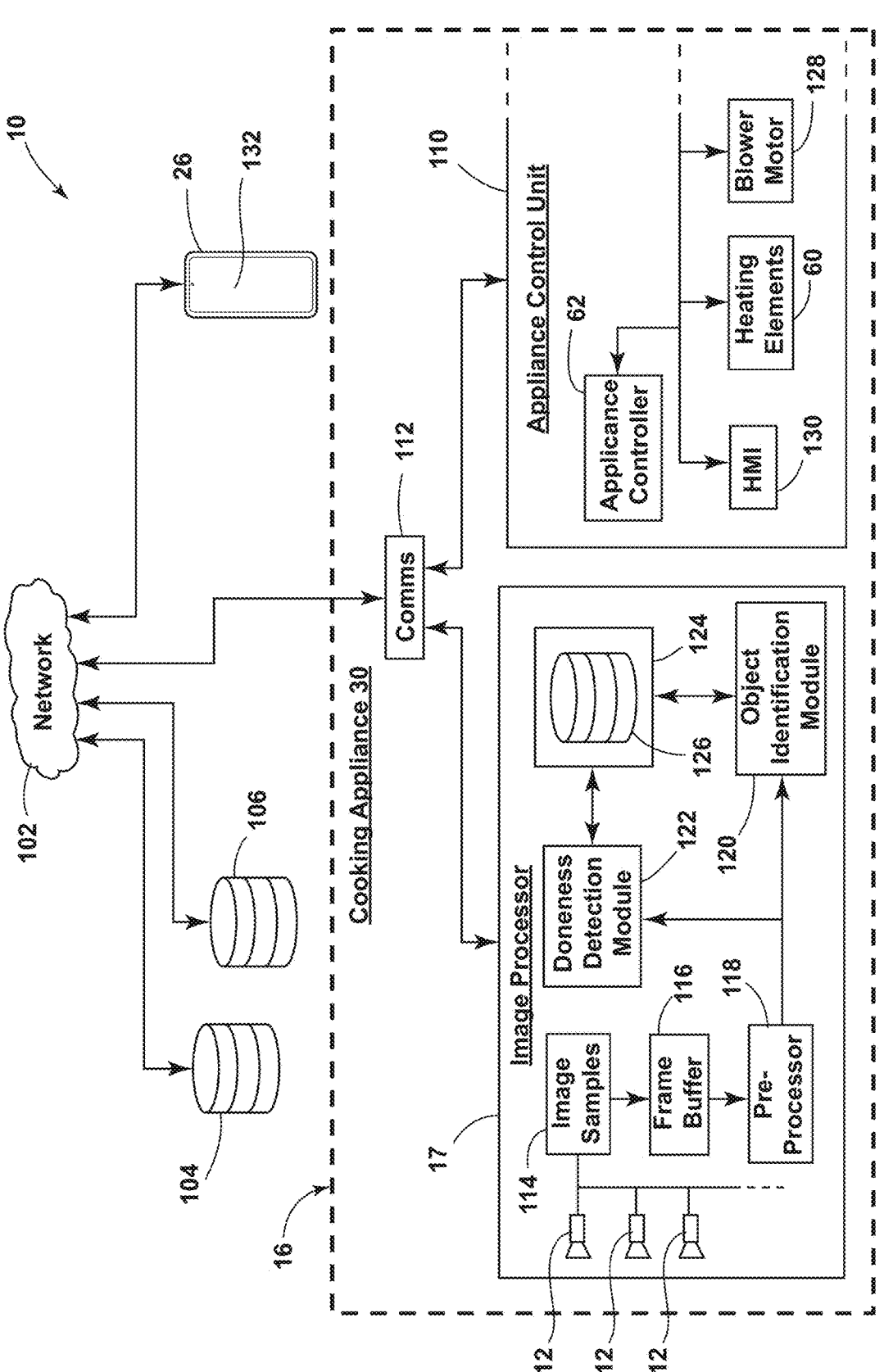
FIG. 15 is a block diagram of an image processing system employed with a cooking appliance according to one aspect of the present disclosure.

Referring now to FIG. 15, the system 10 described herein may include a network 102, such as the Internet or another regional network, that is in communication with one or more remote databases 104, 106, the cooking appliance 30, and the mobile device 26. The cooking appliance 30 may include an image processor 17 and an appliance control unit 110 that each have communication with the network 102 and one another via a communication module 112. The network 102 and/or the communication module 112 may be configured to operate with wireless communication or wired communication. For example, the communication module 112 may utilize various forms of communication interfaces including, but not limited to, 3G, 4G, Wi-Fi, WiMAX, CDMA, GSM, TCP/IP, ZigBee®, Bluetooth®, and/or any suitable wireless communication or wired communication protocol. In general, the image processor 17 is configured to capture and process image data, such as images 14 of the interior 20 previously described, and perform the various functions previously described, such as the rack 36 level detection algorithm, the first image manipulation function 78, and the second image manipulation function 80. The image processor 17 may be configured to execute these algorithms sequentially or in parallel. As previously discussed, the image processor 17 may employ outputs of one algorithm as inputs to a second algorithm. In this way, the image processor 17 may utilize the algorithms efficiently in order to present accurate renderings of the interior 20 of the oven, such as accurate renderings of the food items 40, food containers, and/or support racks 36.

Referring particularly now to FIG. 15, the image processor 17 may include an image sampler 114. The image sampler 114 may gather an image 14 or a sequence of image frames from the image data received from one or more of the cameras 12. The sequence of image frames may be temporarily stored in a frame buffer 116, though the system 10 may not require the frame buffer 116 in some examples. From the frame buffer 116, the image data from the image frames may be retrieved by a pre-processor 118. The pre-processor 118 may process the sequence of image frames from the image data to enhance the contrast, adjust the rotation, correct a boundary, and/or scale or crop the image data. The pre-processor 118 may accomplish such steps by previously described methods, such as by employing the HOG 23, one or more neural networks, filtering techniques, and/or one or more transformation matrices to the image data. Thus, the previously described algorithms and functions may be performed within the pre-processor 118 or another controller in the image processor 17. Other techniques may be employed by the pre-processor 118 as well, such as histogram equalization, image segmentation, other filtering techniques, etc.

The determined rack level H may be stored separately from the image data at this stage of image processing. For example, the determined rack level or position H may be separately communicated to the appliance control unit 110 to indicate the rack level H to the user 28. The rack level H data may additionally or alternatively continue with the target image data into an object detection/identification module 120 which may utilize the rack 36 level along with the normalized image and the de-racked image. The object detection/identification module 120 may process the target image data corresponding to the location of the one or more food items 40 as described herein. An object identification module 120 may process the image data to determine an identity, type, category, proportion, and/or quantity of the food item 40. Additionally, or alternatively, a doneness detection module 122 may be configured to process the target images 150 in order to calculate and/or estimate a doneness level of the food, such as a temperature of the food, a browning of the food, a crispiness level of the food, a contour of a surface of the food, etc.

The object identification module 120 may utilize a variety of scanning methods and/or algorithms to determine the identity of the food item 40. The algorithms may include, but are not limited to, character recognition, feature extraction, clustering, pattern matching, neural network processing, optical character recognition (OCR), or various other recognition techniques. The doneness detection module 122 may employ similar scanning methods and/or algorithms to determine the doneness of the food item 40. Either or both of the object identification module 120 or the doneness detection module 122 may be in communication with a local memory 124 having a local database 126 that includes a library of features and/or characteristics for comparison to the target image 150 data by the object identification module 120 and/or the food doneness detection module 122 to determine the identity of the food or to determine a doneness level of the food item 40. In this way, the system 10 may be operable to determine the identity of the food item 40 and/or a doneness of the food item 40 as discussed here herein.

In some examples, the image processor 17 is a component of a general controller (not shown) or may correspond to a remote image processing system that may be in communication with a local controller. For example, the image processor 17 may be part of the appliance control unit 110, a separate image processor 17, or an image processor 17 remote from the cooking appliance 30 that receives captured images 14 from the camera(s) 12. In some examples, the remote databases 104, 106 previously described may store data related to food identification (e.g., a food identification database 104) and food doneness detection (e.g., a food doneness detection database 106). The remote databases 104, 106 may store similar data as the data stored in the local memory 124 but may be more expansive by incorporating data captured from other appliances with cameras 12 mounted in different locations directed toward the interiors 20 of the other appliances. In general, the remote databases 104, 106 described herein may also include machine learning models 86, 94, 98 that are trained off of the remote databases 104, 106 to detect a food doneness level and/or an identification of the food item 40. In some examples, the images 14 stored in the remote databases 104, 106 and/or the local database 126 are top-down views of the interior 20 of the cooking appliance 30 having a consistent scaling, such that the image processing techniques described herein may be employed across various models of cooking appliances 30 having different camera 12 arrangements and angles. Accordingly, the dimensional data of the CAD models and/or ground truth HOGs of the appliances 16 previously described may be stored in the remote databases 104, 106 and or the local database 126.

For example, the HOG 23 may be utilized for comparison to CAD models of the cooking appliance 30 from various viewing angles as previously described. Additionally, or alternatively, the GAN or the CNN described in reference to FIGS. 5-9 may be employed for adjusting the viewing angle to the target viewing angle. Thus, the previous methods S800 and/or S900 may be used to identify the proper transformation matrix M for the HOG 23 or the initial image 14. The transformation matrix M may then be applied to the image of interior 20 to generate the target view (e.g., a view common to the views stored in the remote and/or local databases 104, 106, 126). Thus, if one model of an oven has a corner-mounted camera 12, and another model of an oven has a door-mounted camera 12, the present food recognition/ doneness detection image processing methods may be substantially unaffected due to the spatial mapping of the interiors 20. Similarly, mobile devices 26 may be employed for capturing images 14 of the interiors 20 of the aforementioned appliances 16 at different angles/positions, and the present food recognition/doneness detection image processing methods may be substantially unaffected due to the spatial mapping of the interiors 20.

Referring now to the appliance control unit 110 of FIG. 15, the appliance control unit 110 may include the appliance controller 62 that is configured to control various operational aspects of the cooking appliance 30. For example, the heating elements 60, a blower motor 128 for the fan 56, and the human-machine interface (HMI) 130 may be controlled by the controller 62. The appliance controller 62 may control other aspects of the cooking appliance 30 not described herein but related to operational parameters of a cooking process. For example, the appliance controller 62 may be configured to control a cooking process based on the image data captured by the image processor 17.

The appliance controller 62 may adjust a cooking process to be a conventional baking cycle or a convection cycle based on the level H of the rack 36 in the interior 20. For example, the controller 62 may determine that a convection cycle may cook the food item 40 more thoroughly or faster when the food item 40 is disposed higher in the interior 20, whereas if the food item 40 were disposed lower in the interior 20 (e.g., in a position of the lower rack 70b), the appliance controller 62 may determine that a conventional baking cycle is more appropriate to achieve a faster cooking time or more even cooking distribution of the food item 40. In one example, the controller 62 controls the heating element(s) 60 to be energized or de-energized depending on the rack 36 location when a cleaning cycle is selected.

In another example, the appliance controller 62 is configured to control the heating elements 60 and/or the blower motor 128 in response to a food doneness level that is calculated based on a de-racked and normalized image 14 of the food in the oven. In this way, the various algorithms described previously with regard to image processing may be directly employed to control the cooking process. Additionally, or alternatively, the appliance controller 62 may communicate an instruction to display an identity and/or a food doneness level of the food item 40 to alert the user 28 to check the status of the cooking process as applied to the food item 40. In this example, the cooking process may not be actively adjusted but rely on further user interaction. The appliance controller 62 may communicate an instruction that is received by the mobile device 26 and displayed on an interface 132 of the mobile device 26 to indicate a similar alert as to a food doneness level or food doneness detection. The alert may be an audible or visual message and/or may include the target image 150 data displayed on a display of the HMI 130 and/or the interface 132 of the mobile device 26. In this way, normalized augmented images 100 may be presented to the user 28 remote from the cooking appliance 30 or at the cooking appliance 30, such that the user 28 may actively monitor the cooking process of the food item 40.

In one example, the image processing system 10 for an oven is configured to generate normalized views of an interior of the oven based on a perspective view. The normalization may allow for more desired views of food items 40 in the interior of the oven to allow for live monitoring of food doneness and/or food recognition. The normalized images may further allow for a machine learning model 86, 94, 98 to be generated having consistent outputs due to the consistent input of a top-down view.

In general, a solution to the problem of an upper rack obscuring an image 14 of the food item 40 on a lower rack may be provided by the present system 10. The system 10 may include an oven having a first lower rack and a second upper rack, a camera 12, a display, and an image processor 17 arranged to receive the image 14 of the food item 40 supported on the first rack. In the event a portion of the image 14 of the food item 40 is partially obscured by a portion of the second rack, the image processor 17 may be configured to: (a) mask the portion of the image 14 obscured by the second rack, (b) remove the masked portion from the image 14, (c) in-paint the removed masked portion based on the non-obscured portion of the image 14 to define a final image, and (d) provide the final image to the display. The system 10 may employ a plurality of neural networks that may include deep learning models to identify the location of racks 36 and perform the masking process. Further, the neural networks may be employed along with filtering techniques, such as Gaussian filtering, to replace missing parts with smoothed conversions of pixels surrounding the area of the image removed. A convolutional neural network may be employed for in-painting. The system 10 may be employed to train the neural networks with consistent final images that have the racks 36 removed from image data. This may allow a more consistent output from the various neural networks employed for food identification, food doneness, or similar identification operations.

Figure 16:
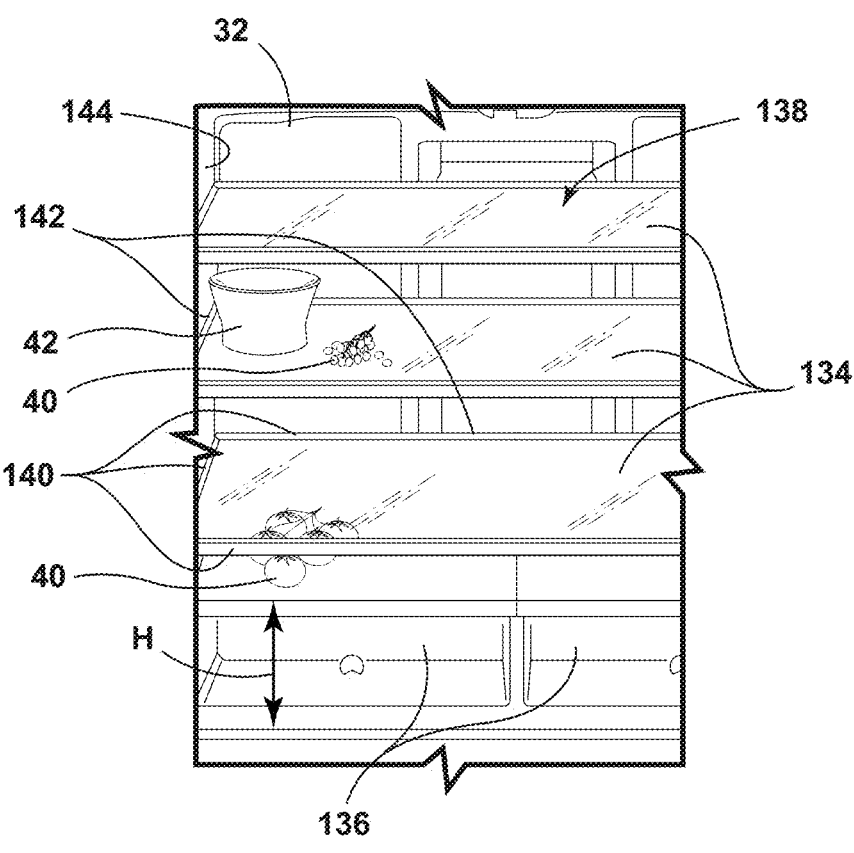
FIG. 16 is an exemplary image of a food storage cavity captured by a door-mounted camera of a refrigerator.
Figure 17:
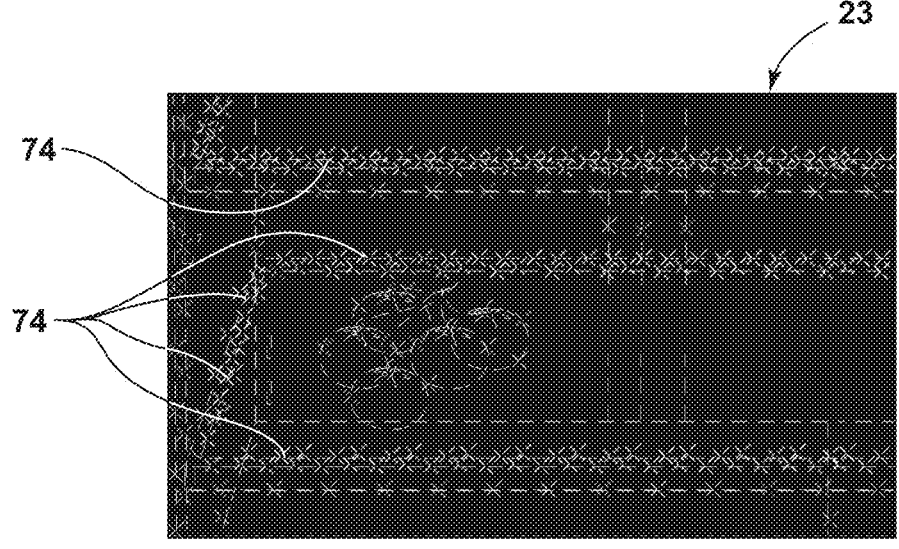
FIG. 17 is a visual representation of a histogram of gradients generated based on the image of FIG. 16.
Figure 18:
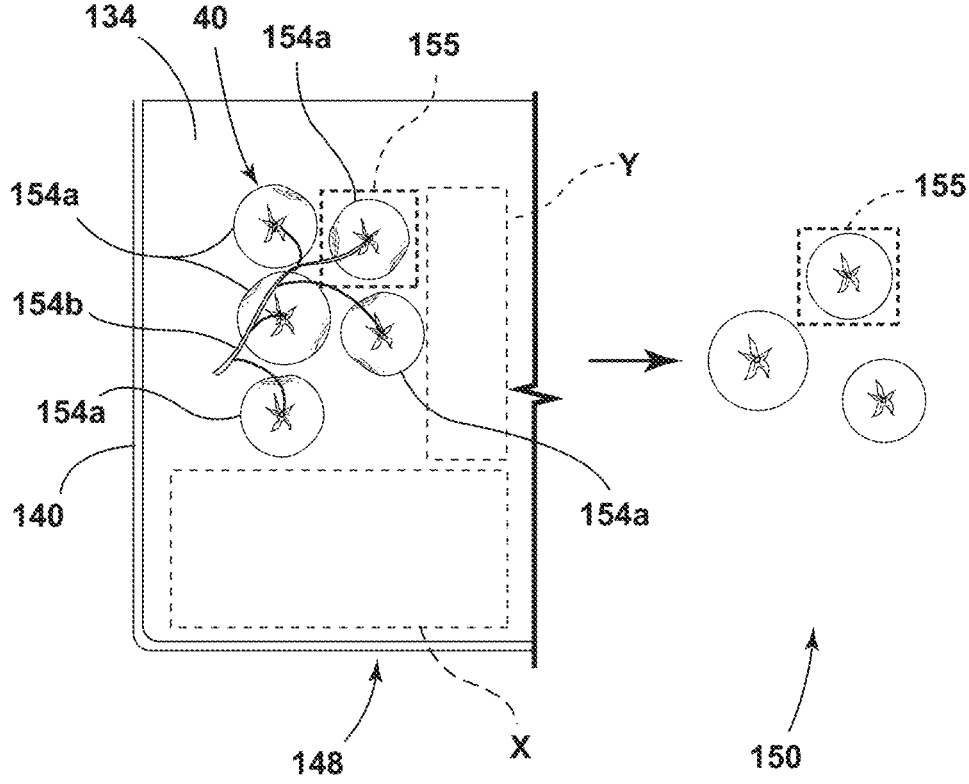
FIG. 18 illustrates a comparison of a transformed image of a food item that is in the refrigerator of FIG. 16 to an image of the food item having a target freshness level.

Referring now to FIGS. 16-18, the image processing system 10 is exemplarily utilized with the food storage appliance 32, such as a refrigerator 32. The food storage appliance 32 may include support shelving 134 and drawers 136 disposed in a storage cavity 138 of the food storage appliance 32. Accordingly, the support shelving 134 and the drawers 136 may be operable as the previously described support members 18, and the storage cavity 138 may serve as the cavity 20 previously described. The image processing system 10 is configured to execute an automatic shelving or drawer level detection algorithm to identify the position of the shelving 134 and/or the drawers 136 in the storage cavity 138, similar to the rack level detection level described with respect to the preceding examples. Detection of the position of the shelving 134 and/or the drawers 136 may provide for more accurate renderings of the storage cavity 138 when performing the normalization functions previously described on the initial images 14 of the storage cavity 138. For example, proper proportions and/or scaling for target viewing angles of the storage cavity 138 may be generated based on initial views of the storage cavity 138 and, in turn, allow the processor 17 determine locations of shelving 134/drawers 136.

In some implementations, the normalized/re-oriented views produced by the system 10 may allow the image processor 17 to perform additional determinations and calculations related to food storage operations. For example, by detecting the position of the support shelving 134/drawers 136, a position of the food item 40 and/or the dishware 42 in the interior 20 may be determined or inferred via a space optimization function performed by the processor 17. In other examples, a freshness detection algorithm may be executed by the processor 17 based on the modified image data (e.g., normalized and/or in-painted images), and a recommended or automatically controlled climate control cycle of the storage cavity 138 may be adjusted based on the determined location or degree of spoilage of the food item 40. As will be further described below, such space optimization and food spoilage detection functions may be achieved via the processor 17 comparing the normalized image of the food item 40 in the storage cavity 138 to pre-stored images of the same food item 40 in a target state, such as a fresh state, a ripened state, etc.

The image processing techniques previously described in reference to FIGS. 5-9 and in reference to the cooking cavity 38 of the cooking appliance 30 in reference to FIGS. 10-15 may also, or alternatively, be applied to the storage cavity 138 of the storage appliance 32. For example, automatic perspective normalization may be applied to the food items 40 and/or the dishware 42 in the storage cavity 138 to generate target views 148 of the food items 40/dishware 42. The image normalization method for the present storage appliance 32 may thus include the processes of S800 and/or S900 to first adjust the captured image 14 to a target viewing angle (e.g., a top view or a front view) and determine the storage configuration, a freshness of the food items 40, or another function for the storage appliance 32. Further, the first and second image manipulation processes 78, 80 may be applied to detect the support shelving 134/drawers 136, identify a level H of the shelving 134, transpose the initial image 14, remove occlusions 82, in-paint with surrounding pixel data, and compare the modified image 14 to target image data. For example, the histogram of gradients 23 previously described may be applied to the image 14 of the storage cavity 138 in order to identify the position of the shelving 134 and/or the drawers 136, to aid in the transformation of a perspective view of the storage cavity 138 to the target view 148.

As illustrated in FIG. 17, the histogram of gradients 23 may be applied to the initial image 14 to identify patterns of similar or different pixel values in the initial image 14 to identify slopes that may correlate with projection lines. Based on the slope of lines formed by the pixel data (e.g., in the HOG 23), the image processor 17 may determine the position of the shelving 134 and/or the drawers 136. It is contemplated that the slopes may correspond to edges 140 of the shelving 134 and/or intersection 142 of the shelving 134 with a body 144 of the storage device 32. Similar to the example illustrated in FIGS. 12C and 13C, the histogram of gradients 23 may present a plurality of gradients 74 which may be determined based on analysis of the pixel data in the images 14 to identify patterns. Orientations of the regions (e.g., cells 76) in the histogram of gradients 23, including the slopes of the lines, may be correlated with positions of the shelving 134. This correlation may allow the image processor 17 to determine the position of the food item 40 and/or the dishware 42 on the shelving 134 or in the drawer 136 to aid in perspective normalization and/or cropping of image data to form the target view 148 (FIG. 18). For example, the magnitude of the gradients 74 from the initial images 14 of the shelving 134 at different levels relative to a floor of the refrigerator 32 or another shelf 134 in the refrigerator 32 may be used to determine which shelf 134 the food item 40 is on and the height H of the shelf 134. For example, the density of the line segments that intersect at the intersection 142 of the edge 140 of the shelving 134 and the body 144 of the refrigerator 32 may be analyzed by the processor 17 to determine the height H.

As shown in FIG. 17, the gradients 74 are generally aligned with the direction of the edge 140 of the shelving 134 for a given height H. By correlating the actual histogram of gradients 23 generated based on the initial image 14 to historical or predefined histograms of gradients 23 associated with each position of the shelving 134 (e.g., the ground truth HOGs), the image processor 17 may determine the position of the shelving 134. Similar to the examples of FIGS. 5-9, the GAN, CNN, or CAD models may be employed in conjunction with the HOG 23 and the dimensional data of the storage appliance 32 to normalize the initial image 14 and determine the position/level H. For example, the GAN and/or the CNN may be trained on images 14 of all storage configurations of the shelving 134/drawers 136 in the storage appliance 32. The identification features for the storage appliance 32 may include the depth of the shelving 134, the arrangement of the refrigerator 32 relative to the freezer (e.g., top/bottom configuration, side-by-side configuration). In this way, the proper transformation matrix M may be selected by the image processor 17 to generate the target view 148 for a plurality of configurations. Accordingly, the neural networks previously described with respect to FIGS. 5-9 may be trained based on images and/or CAD data for a plurality of models of and storage configurations for the storage appliance 32.

Once the features of the HOG 23 are extracted from the initial image 14, the features may be compared to known predefined ground truth features corresponding to previously identified grades associated with the given level of the shelving 134, as described above. The HOG 23 comparison described in reference to FIGS. 11C and 12C may be applied similarly to the present example and may include averaging a plurality of measurements between the identified gradients 74 and ground truth features to determine the height H. In other examples, other statistical or logical deductive steps that allow the system 10 to identify the height H of the shelving 134 from a comparison of the identified gradients 74 in the ground truth features may also/alternatively be implemented. Further, alternative processing techniques previously described with respect to the processing features applied to the cooking cavity 38 may also be applied to the storage cavity 138, such as SURF detection, Gabor filtration, or other image view reconstruction techniques.

Following the position detection algorithm for the shelving 134/drawers 136 of the storage cavity 138, the image processor 17 may perform the first and second image manipulation processes 78, 80 to generate the target view 148 of the food items 40 or the dishware 42 and crop obstructions 82 from the image data to render clean versions of the target views 148. With reference to FIG. 18, the target view 148 of one food item 40 in the interior 20 (tomatoes) is illustrated on the shelving 134 following the transformation of the initial view demonstrated in FIG. 16. The first and second image manipulation processes 78, 80 may be employed on images 14 of the storage cavity 138 in a similar manner to those employed for images 14 of the cooking cavity 38 previously described. Accordingly, normalization functions may be employed to manipulate the image data to create the target view 148 of the food item 40 which, in this case, is a top-down view of the tomatoes. Following normalization, the target view 148 may be localized to focus on the food item 40 or a part of the food item 40 that may indicate a freshness level. For example, the tomatoes may include a plurality of units (e.g., individual tomatoes 154a and vines 154b), with one or more of the units being a representative object 155 for freshness detection (e.g., the fruit of the tomato vine). The representative object 155 may be determined by the processor 17 based on trained models for individual food items 40.

Following the first image manipulation process 78, the second image manipulation process 80, including the obstruction removal process and in-painting performed on the target view 148 may be applied to the initial image 14. As demonstrated in FIG. 17, another shelving member 134 may partially conceal or obstruct the view of the tomatoes and thus may be required to be removed in order to have a clear view of the tomatoes from a top-down perspective. Thus, by employing the pixel analysis and procedures of the second image manipulation process 80 previously described in relation to FIG. 9, the obstruction 82 may be removed from the modified image and a clear view of the tomatoes may be provided.

With continued reference to FIG. 18, the image processor 17 may be configured to compare the target view 148 of the food item 40 to an image stored in one of the databases or uploaded by the user 28. Thus, the initial image 14 from the target view 148 may be compared to a target image 150 that corresponds to, for example, a fresh or unspoiled version of the food item 40 identified in the initial image 14. The representative object 155 may be analyzed to determine the freshness of the entire food item 40, in some examples. Based on the comparison, the image processor 17 may further determine that the food item 40 in the interior 20 (e.g., the storage cavity 138) is spoiled or fresh. Other determinations may further be made by the image processor 17, such as the determination of a target location for the food item 40, the determination of mold on the food item 40, or the like.

In general, the target image 150 may be employed to determine the target view 148 for the storage appliance 32 and thus cause the image processor 17 to implement the first and second image manipulation processes S800, S900, 78, 80 in a specific way (e.g., a select transformation matrix M) that depends upon a target viewing angle for the food item 40. For example, if the user 28 uploads a target image 150 of the tomatoes from an inclined view, the image processing device 17 may analyze the target image 150 using one or more of the previously described image analysis features to determine the viewing angle and manipulate the perspective view of the tomatoes as captured in FIG. 16 to be in an inclined view. For example, as previously described in reference to image analysis of the cooking cavity 38 and the cavity 20, the inverse operation may allow the processor 17 to determine the position and orientation of the imaging device 12 using CAD dimensional data, the GAN, and/or the CNN. Other image processing techniques, such as landmark analysis, triangulation, or other methods previously described may also be employed in conjunction with the GAN/CNN and CAD model techniques. Thus, the present image processing system 10 may work in the inverse operational mode in which the target view 148 is determined based on a view of the target image 150. This inverse operation mode may be employed in conjunction with any of the appliances described herein.

With continued reference to FIG. 18, the target view 148 may allow the processor 17 to more effectively calculate spatial limitations of the storage cavity 138. For example, spaces X, Y in front of, behind, aside, above, or below the food item 40 may be identified by the processor 17 using the target view 148. The spaces X, Y may be indicated to the user 28 to aid in inventory management of the storage device 32. For example, the processor 17 may compare the size of the spaces X, Y to known food items 40 to determine whether certain dishware 42 or food items 40 may fit in the spaces X, Y and communicate an indication whether a particular food item 40 or dishware 42 will fit in the spaces X, Y.

Figure 19:
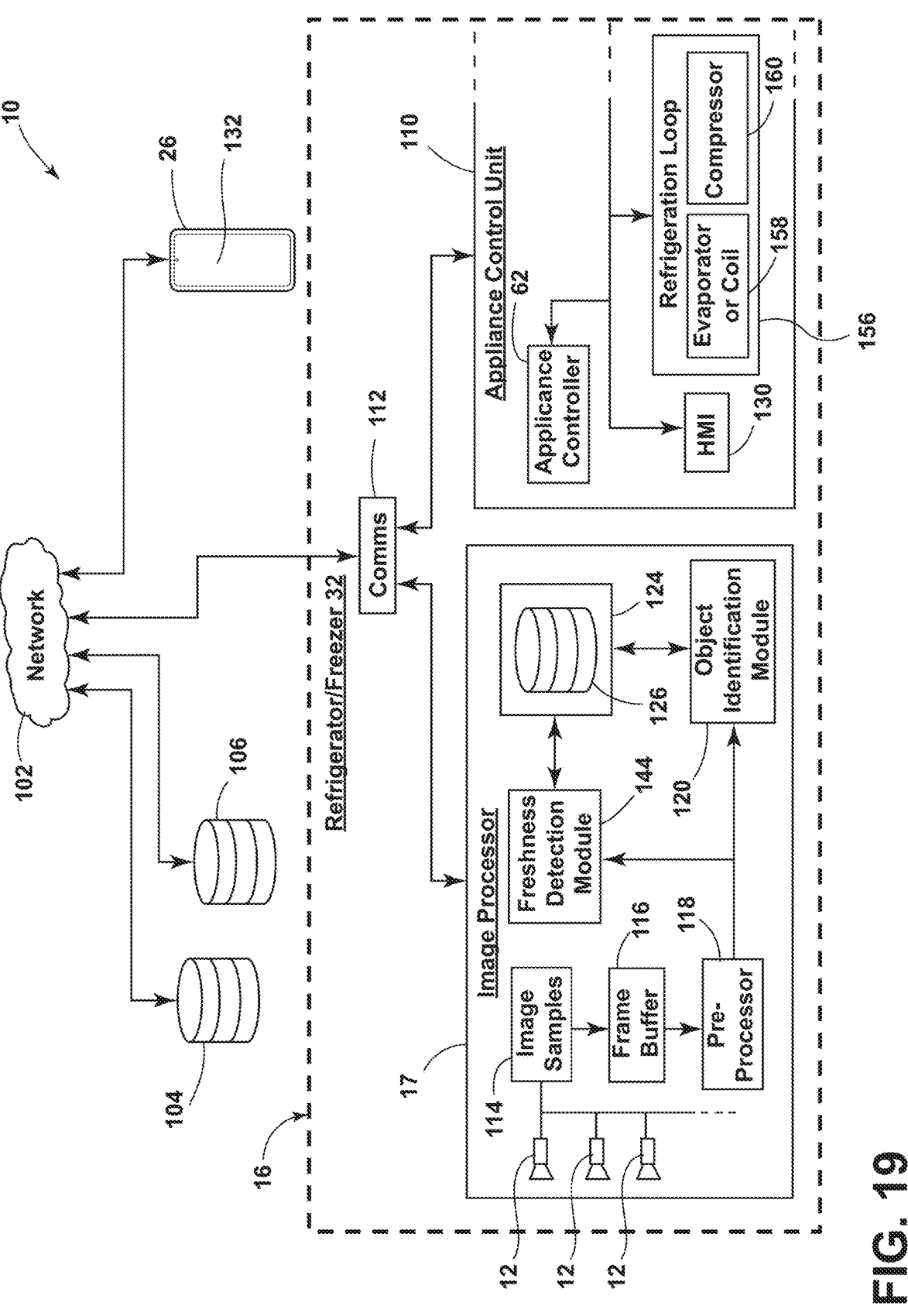
FIG. 19 is a block diagram of an image processing system employed with a food storage appliance according to one aspect of the present disclosure.

Referring now more particularly, to FIG. 19, the features previously described with respect to FIG. 15 may be employed for the storage appliance 32, such as a refrigerator 32, or freezer. In this example, the image processor 17 may be in communication with the remote databases 104, 106 previously described, with one of the remote databases 104,

106 serving as the food identification database 104 and another of the remote databases 104, 106 serving as a spoilage detection database. In some examples, at least one of the remote databases 104, 106 or the local database 126 includes the images and/or ground truth HOGs for the shelving 134 and/or drawings 136 in various storage configurations for various models of the storage appliance 32. The spoilage detection database may store image data that demonstrates various spoilage levels for various food items 40. For example, the spoilage detection database may store images 14 of spoiled meats, vegetables, fruits, and various stages thereof to train various models to detect spoilage of actual contents of the storage cavity 138.

In the example illustrated in FIG. 18, the image processor 17 may compare the actual image 14 to a plurality of images having a consistent viewing angle but differing degrees of spoilage in order to determine a degree of spoilage of the food item 40. For example, the discoloration or discolored patches on the tomatoes in FIG. 18 may match or correlate with a 50% degree of spoilage of the tomatoes based on the plurality of images. A freshness detection module 154 may be part of the image processor 17 and configured to perform the various comparisons described above in order to estimate or calculate the degree of decay or spoilage. The freshness detection module 154 may also be in communication with the local database 126 that may also store the plurality of images associated with spoilage.

The freshness detection module 154 may be configured to further identify target positions for specific food items 40 based on a history of spoilage in the storage cavity 138. For example, if poultry stored in a back left corner of the storage cavity 138 in a particular climate results in spoilage after one week of storage (as determined by the image processor 17), whereas poultry stored in a front right area of the refrigerator 32 is determined to have spoilage upon only four days of storage in the refrigerator 32, the freshness detection module 154 may communicate an instruction to the user 28 to store poultry in the back left corner of the refrigerator 32 or in a location in the refrigerator 32 other than the front right position of the refrigerator 32. In other examples, the freshness detection module 154 may differentiate between perishable and non-perishable foods and/or employ models trained to determine whether a food is perishable or not. For example, the freshness detection module 154 may determine that the food item 40 is in a sealed package or that the sealed package is likely unsealed based on an image comparison of the food item 40 at a multitude of times (e.g., daily across several consecutive days). Thus, the freshness detection module 154 may perform calculations or estimations beyond determining the degree of freshness of the food item 40.

In one non-limiting example, the image processor 17 may be configured to provide instruction and guide to spatially position items to maximize storage efficiency of the refrigerator 32 by transforming the initial view to a top-down or side view within the refrigerator 32. For example, by translating views of the storage cavity 138 to a top-down view, the image processor 17 may identify vacancies X, Y on the shelving 134 and communicate an instruction to the user 28 to move the food items 40 and/or dishware 42 in order to allow for the more food items 40 or dishware 42 to be stored in the refrigerator 32. As demonstrated in FIG. 18, the top-down view of the tomatoes may identify vacant spaces X, Y surrounding tomatoes and may communicate a recommendation to adjust a position of the tomatoes to make room for other dishware 42 or food items 40.

With continued reference to FIG. 19, the appliance controller 62 of the storage appliance 32 may include a refrigeration loop 156, which may control the temperature of the climate controlled storage cavity 138 via one or more cooling devices. For example, the refrigeration loop 156 may include an evaporator coil 158, a compressor 160, or any other component that is configured for a cooling operation to cool air within the storage cavity 138 via expansion and condensing of refrigerant. In this example, the appliance controller 62 may be in communication with the image processor 17 to control the refrigeration loop 156 to cool or limit cooling of the storage cavity 138 in response to detection of quick or slow spoilage of the food items 40 as identified by the image processor 17. Additionally, or alternatively, the appliance controller 62 may communicate a signal to the HMI 130 to display the signals previously described with respect to detection of spoliation, space optimization, food identification, and similar operations. In general, application of the image processing techniques to a refrigerator, freezer, or other climate controlled storage device 32 may provide for a target inventory management system by providing clearer images 14 of the contents of the storage cavity 138.

As previously described in relation to FIG. 4B and FIGS. 5-10, the present image processing techniques may be applied to images 14 captured from the mobile device 26, directed toward the interior 20. By providing for a dynamic reference measurement system (e.g., a non-fixed system), differing angles of the imaging device 12 may be incorporated and still produce the target view 148 with a consistent redundancy. Thus, legacy appliances that may have an imager omitted from coupling with the food storage device 32 may be utilized with remote imaging devices 12, such as those on the mobile device 26. Accordingly, the adaptive measurement system incorporated with the storage appliance 32 may account for various angles caused by the imaging device 12 being spaced from the appliance 16 at different angles, distances, and/or orientations, as well as small deviations caused by temperature fluctuations, mechanical drift, mechanical stress, bumping into imagers, or the like. In this way, the present spatial mapping system may be dynamic and adaptive. As previously described with respect to the obstruction removal process of FIG. 14, the imaging techniques of the present disclosure may also provide for digital removal of condensation or other distorted areas in the image data. For example, condensation on the shelving 134, the drawers 136, or a lens of the imaging device 12 may be digitally removed and in-painted via the image manipulation previously described with respect to the obstruction detection routine of FIG. 14.

Referring now to FIGS. 20-23, the image processing system 10 is exemplarily utilized with a dish treatment appliance 34. In this example, the support member 18 previously described is a support rack, or a frame 162, of a drawer. Further, in this example, the cavity 20 is a dish treatment cavity 161 for receiving dishes (e.g., plates 176, bowls 178, and utensils 180) to be cleaned. Similar to the previously described examples, the image processing system 10 is configured to identify positions of the dishware 42 in the dishwasher 34 based on the framework 162 identified in the initial image 14 or the modified image. The positions of the framework 162, or the support drawers, may allow the image processor 17 to identify the position of the dishware 42 in the dish treatment cavity 161. By detecting the position of the framework 162 relative to the dishware 42, a position of the dishware 42 may be determined or inferred and the image manipulation processes 78, 80 previously described may be performed to attain a status or position of the dishware 42. Additionally, or alternatively, by determining the position of the dishware 42, a status of the dish treatment device 34 may be determined and communicated to the user 28 via, for example, the HMI 130, such as a degree of fullness or emptiness of the treatment cavity 161. In this way, the framework detection algorithm may aid in the space optimization of the dish treatment appliance 34.

Figure 20:
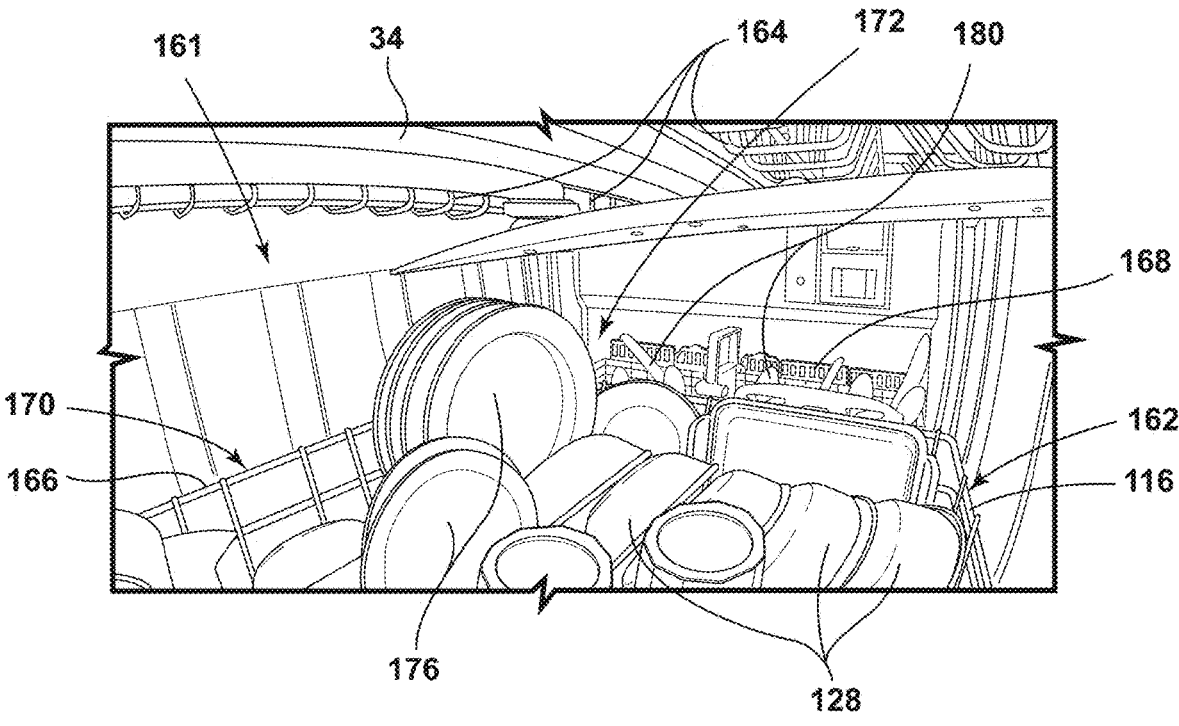
FIG. 20 is an exemplary image of a dish treatment cavity captured via a rear-wall mounted camera of a dishwasher.

Referring now more particularly to FIG. 20, a view of the dish treatment appliance 34 from the perspective of an interior-mounted imaging device 12 is demonstrated and shows the outer wall of the treatment cavity 161, an underside of an upper framework 164 (e.g., a dishwasher drawer), and a lower portion of the treatment cavity 161, including various dishware 42 and a lower framework 166. Also included in the lower framework 166 is a utensil cartridge 168, or bracket, for supporting cooking utensils 180 to be cleaned. The utensil bracket 168 may constitute at least a portion of the framework 162 and be detected via the image analysis presented in FIG. 21 by the previously described methods employed for generating the histogram of gradients 23 based on the initial image 14, further described below.

Figure 21:
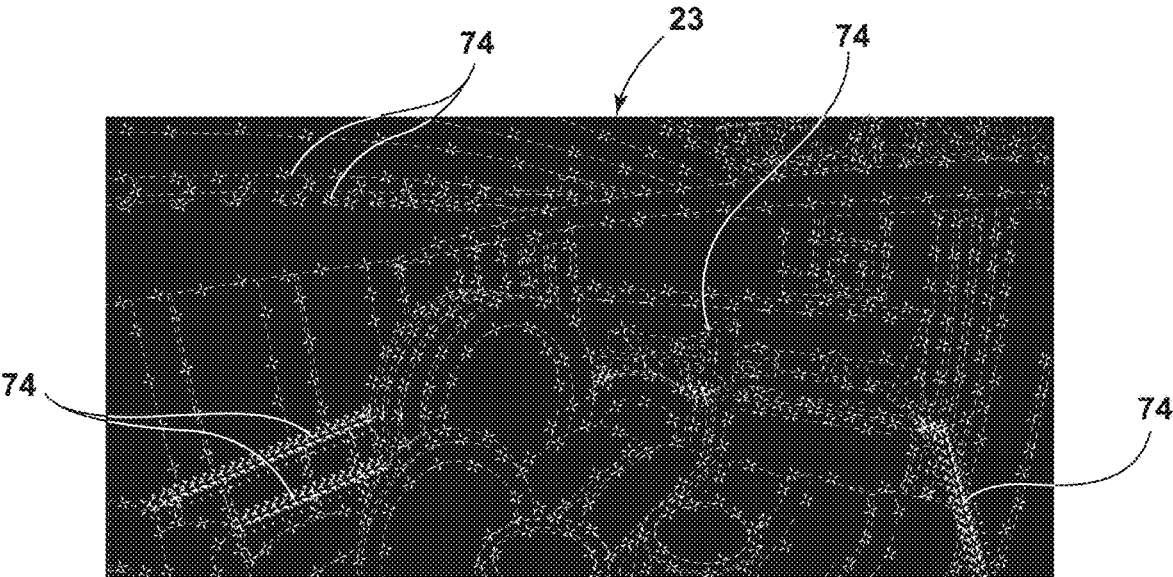
FIG. 21 is a visual representation of a histogram of gradients generated based on the image of FIG. 20.

Similar to the previously described examples, views from other imagers may be employed in combination with or an alternative to the particular view/imager arrangement depicted in FIGS. 20 and 21. For example, stereoscopic imagers or imaging devices 12 remote from the dish treatment device 34 may be employed for capturing the interior 20 of the dish treatment device 34 when the door 46 is opened. In other examples, images 14 captured from the mobile device 26 (e.g., from an unknown viewing position/angle) may be properly transformed to the target view 148 using CAD models and/or neural networks. Further, the identification features of the dishwasher 34, such as patterns on a wall of the dishwasher 34, the framework 132, and or the edges 35*a*, 35*b*, 35*c* previously described with reference to FIGS. 5-10 may be identified for determining the actual proportions of the dishwasher 34. In the illustrated example, the interior-mounted imaging device 12 captures a perspective view toward a front of the dish treatment device 34 in order to capture the lower framework 166.

Referring now to FIG. 21, the histogram of gradients 23 previously described may be applied to the initial image 14 captured and illustrated in FIG. 20 to identify strong gradients 74 and associate such strong gradients 74 with, for example, perspective converging lines that, if continuous, converge to a vanishing point. In this example, the various framework 162 that extends between the dishware 42 (e.g., prongs, rails, flexible brackets, etc.) may be identified in the image data. Based on the particular prongs that are concealed by the dishware 42, the image processor 17 may determine the spatial limitations, the capacity, or the fill level of the dish treatment device 34. For example, an open space 170 may be identified amongst the drawer in the image data based on the strong gradients 74 caused by the exposed lower framework 166 as compared to the filled area 172 in FIG. 21 that is filled with plates 176. In some examples, the fill level is determined by estimating a first volume of the objects 22 identified in the framework 162 and comparing the first volume to a second volume of the interior 20 when there are no objects 22 in the framework 162 (e.g., calculating a difference in the first and second volumes). Thus, based on the histogram of gradients 23, the particular distance, depth, or general position of particular dishes 176, 178, 180 in the dishwasher 34 may be determined and thus provide an easier way of preparing the target view 148 of the dishware 42 for comparison to images stored in the remote or local databases 104, 106, 126 and/or an image uploaded by the user 28.

Figure 22:
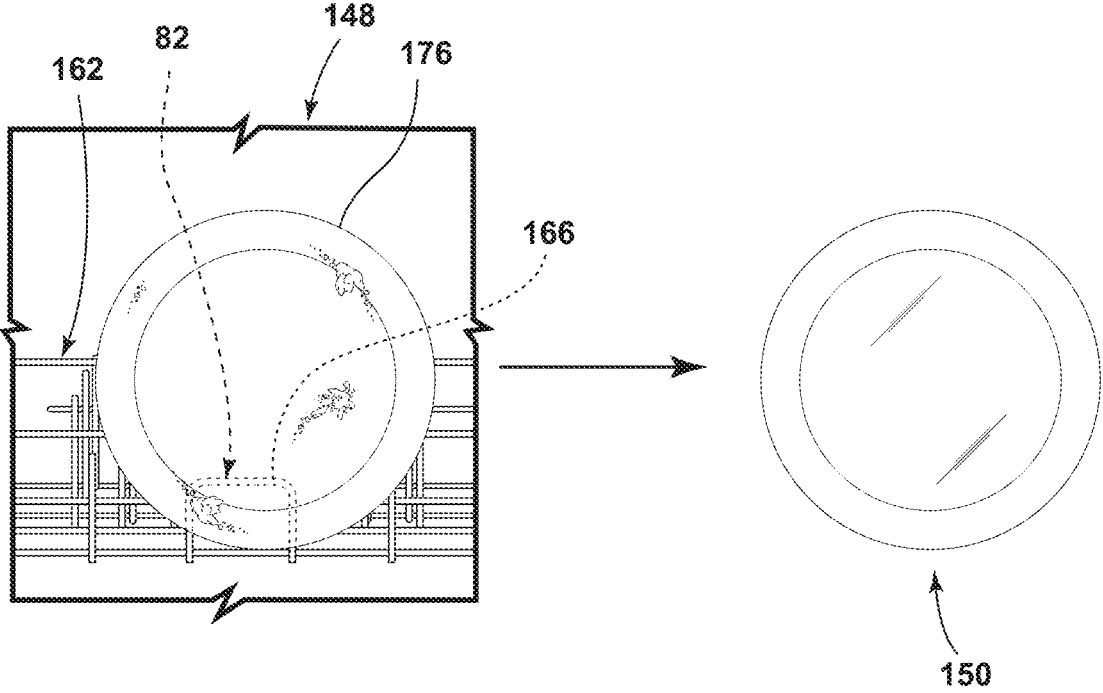
FIG. 22 illustrates a comparison of a transformed image of a dish in the dishwasher of FIG. 20 to an image of the dish having a target cleanliness level.

For example, and with reference to FIG. 22, the target view 148 of the dishware 42 may be compared to a target image 150 of a clean dish in order to determine the degree of filling of the compartment, the degree of cleanliness or of the dirtiness of the dishware 42 and/or a dirty/clean status of the dish treatment device 34. For example, the image processor 17, upon removing obstructions 82 of the framework 162 and/or other dishware 42, and upon perspective normalization, may identify stains/food debris on the dishware 42. The processor 17 may then compare the image 14 of the debris to the image 14 of a clean plate stored in the remote or local databases 104, 106, 126 in order to determine a cleanliness status of the dishware 42. Based on this comparison, the image processor 17 may be configured to estimate or determine whether the dish treatment appliance 34 holds a dirty load or a clean load, whether the treatment cavity 161 is full, a capacity level of the treatment cavity 161, etc. Based on this determination, and as will be described in reference to FIG. 23, the image processor 17 may communicate a signal to the appliance controller 62 to proceed with a particular cleaning cycle, rinsing cycle, or the like.

Figure 23:
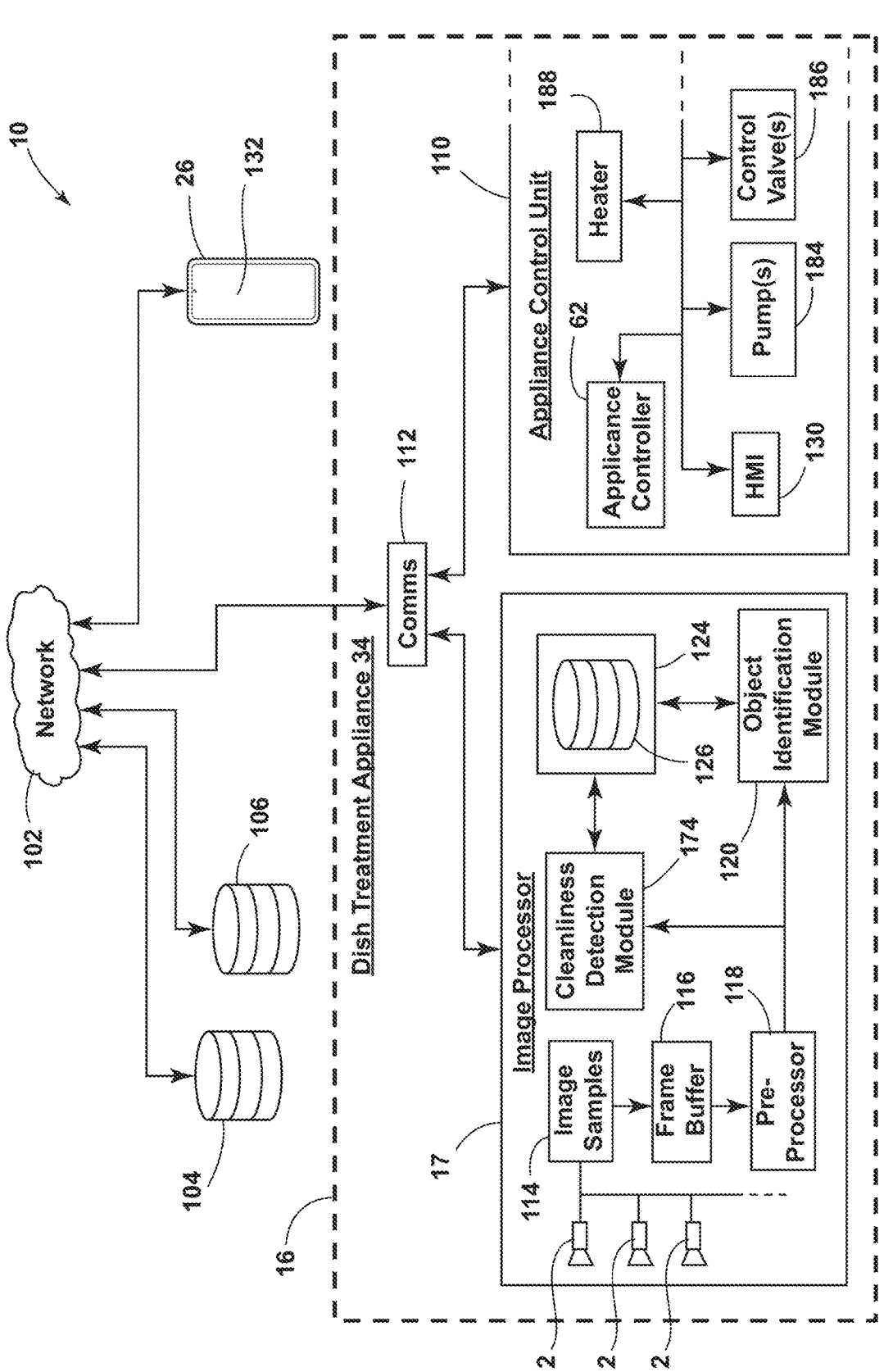
FIG. 23 is a block diagram of an image processing system employed with a dishwasher according to one aspect of the present disclosure.

Referring now to FIG. 23, the image processor 17 for the dish treatment appliance 34 may include a cleanliness detection module 174 that is in communication with the object identification module 110 and the remote and local databases 104, 106, 126. In this example, one of the remote databases 104, 106 may be an object identification database, and another of the remote databases 104, 106 may be a cleanliness detection database 94 that is configured to store images of various stages of cleanliness of dishware 42. In this way, the image processor 17 may compare the initial images 14 captured via the imaging device 12 or the modified image to previously captured or pre-stored image data representing varying degrees of cleanliness of various dishes, such as plates 176, bowls 178, utensils 180, and the like. In general, the cleanliness detection module 174 may be employed to determine a level of cleanliness and based on the level of cleanliness, control a cycle, such as a rinse cycle, a wash cycle, a heat cycle, etc. for the appliance control unit 110 to execute. For example, the cleanliness detection module 174 may communicate a signal or instruction to the appliance controller 62 to control one or more pumps 184, control valves 186, or heating devices 188, or the like of the dishwasher 34 in response to the degree of cleanliness detected.

Based on the spatial limitations of the dishwasher 34, storage management information may be communicated by the image processor 17 to the appliance controller 62, which may communicate instructions to the HMI 130 to communicate to the user 28 that the dishwasher 34 is full, empty, or partially empty/partially full. In addition, the storage management feature may communicate an instruction as to the efficiency of the storage based on the identified objects 22 in the treatment cavity 161. For example, if plates 176 are detected to be stored in the upper rack, and the cups are stored in a lower rack, the object detection module 120 may determine that such a configuration is not optimal and that the space within the treatment cavity 161 is not optimized to allow for more dishware 42 to be stored in the treatment device 34. As previously described, the histogram of gradients 23 application may allow for such determination of free space with the dishwasher 34 and/or the proper renderings of the images having the target view 148, such as a front plan view demonstrated in FIG. 22.

In general, the image processing techniques previously described with respect to the cooking appliance 30 and the refrigerator 32 may be similarly applied to the dishwasher 34. Although the output/status determination may differ from the previous examples, the HOG 23 application to images 14 of the dish treatment appliance 34 may allow for the same image transformation techniques as applied to each kitchen appliance 16. For example, image normalization may be employed via the HOG 23 and dimensional data presented in the CAD model or determined by the neural networks (e.g., the GAN or the CNN). The first and second image processing methods 78, 80 may also be employed for obstruction removal and inpainting. Thus, the present system 10 may be applied similarly to any kitchen appliance 16 having a support member 18 in a cavity.

The invention disclosed herein is further summarized in the following paragraphs and is further characterized by combinations of any and all of the various aspects described herein.

According to one aspect of the present disclosure, an image processing method for a cooking system includes capturing, via at least one imaging device, an image of a cooking cavity of the cooking appliance. The method further includes identifying a support member in the cooking cavity based on the image via a processor in communication with the at least one imaging device. The support member is configured to support a food item thereon. The method further includes determining a histogram of gradients based on the image via the processor. The method further includes determining a position of the support member based on the histogram of gradient.

According to another aspect of the present disclosure, the method includes determining a height level of the support member relative to a floor of the cooking cavity based on the histogram of gradients.

According to another aspect of the present disclosure, the method includes modifying the image via brightness normalization prior to determining the histogram of gradients.

According to another aspect of the present disclosure, the method includes processing the image in a convolutional neural network configured to generate a mask indicating an obstruction overlaying a view of the food item. The method further includes removing a portion of the image corresponding to a first region defined by the mask.

According to another aspect of the present disclosure, the method includes determining surrounding pixel values corresponding to a second region of the image adjacent to the first region. The method further includes calculating target pixel values for the first region based on the surrounding pixel values. The method further includes modifying the portion of the image to include the target pixel values for the first region.

According to another aspect of the present disclosure, the method includes outputting, via the processor, modified image data to a display demonstrating the food item clear of the obstruction.

According to another aspect of the present disclosure, the method includes calculating a food doneness level based on the modified image data.

According to another aspect of the present disclosure, the method includes updating, at an appliance controller in communication with the processor, a heating operation of the cooking appliance based on the food doneness level.

According to another aspect of the present disclosure, the method includes identifying the food item based on the modified image data.

According to another aspect of the present disclosure, the image is taken from an initial view of the cooking cavity.

According to another aspect of the present disclosure, the method includes determining a transformation matrix based on the position of the support member. The method further includes processing the image in the transformation matrix to generate a target view of the cooking cavity different than the initial view.

According to another aspect of the present disclosure, the method includes communicating an instruction to present the target view at a display in communication with the processor.

According to another aspect of the present disclosure, the method includes determining a food doneness level of the food item based on the target view. The method further includes communicating, via the processor, a signal to an appliance controller to control a heating operation based on the food doneness level.

According to another aspect of the present disclosure, the method includes receiving, at the processor, target image data demonstrating a target state of the food item, and determining the target view based on the target image data.

According to another aspect of the present disclosure, a cooking system includes a cooking appliance that includes a cooking cavity for receiving a food item. A support member is disposed in the cooking cavity configured to support the food item thereon. An imaging device is configured to capture an image of the cooking cavity from an initial view. A processor is in communication with the imaging device and configured to identify the support member based on the image, determine a histogram of gradients based on the image, and determine a position of the support member based on the histogram of gradients.

According to another aspect of the present disclosure, the processor is further configured to determine a transformation matrix based on the position of the support member and processor the image in the transformation matrix to generate a target view of the cooking cavity different than the initial view.

According to another aspect of the present disclosure, a display is in communication with the processor. The processor is further configured to communicate an instruction to present the target view at the display.

According to another aspect of the present disclosure, a heating element in the cooking cavity, and an appliance controller is in communication with the heating element and the processor. The processor is further configured to determine a food doneness level of the food item based on the target view. The appliance controller is configured to control the heating element based on the food doneness level.

According to another aspect of the present disclosure, an image processing method for a cooking system includes capturing, via an imaging device, an image of a cooking cavity of a cooking appliance from an initial view. The method further includes identifying a support rack in the cooking cavity based on the image via a processor in communication with the imaging device. The support rack is configured to support a food item thereon. The method further includes determining a histogram of gradients based on an orientation of a rail of the support rack in the image via the processor. The method further includes determining a position of the support rack based on the histogram of gradients. The method further includes determining a transformation matrix based on the position of the support rack. The method further includes processing the image in the transformation matrix to generate a target view of the cooking cavity different than the initial view.

According to another aspect of the present disclosure, the method includes determining a food doneness level of the food item based on the target view. The method further includes communicating, via the processor, a signal to an appliance controller of the cooking appliance to control a heating operation based on the food doneness level.

According to another aspect of the present disclosure, an image processing method for a climate-controlled storage system includes capturing, via at least one imaging device, an image of a storage cavity of a storage appliance. The method further includes identifying a support member in the storage cavity based on the image via a processor in communication with the at least one imaging device. The support member is configured to support a food item thereon. The method further includes determining a histogram of gradients based on the image via the processor. The method further includes determining a position of the support member based on the histogram of gradients.

According to another aspect of the present disclosure, the method includes determining a height level of the support member relative to a floor of the storage cavity based on the histogram of gradients.

According to another aspect of the present disclosure, the method includes modifying the image via brightness normalization prior to determining the histogram of gradients.

According to another aspect of the present disclosure, the method includes processing the image in a convolutional neural network configured to generate a mask indicating an obstruction overlaying a view of the food item. The method further includes removing a portion of the image corresponding to a first region defined by the mask.

According to another aspect of the present disclosure, the method includes determining surrounding pixel values corresponding to a second region of the image adjacent to the first region. The method further includes calculating target pixel values for the first region based on the surrounding pixel values. The method further includes modifying the portion of the image to include the target pixel values for the first region.

According to another aspect of the present disclosure, the method includes outputting, via the processor, modified image data to a display demonstrating the food item clear of the obstruction.

According to another aspect of the present disclosure, the method includes comparing the modified image data to a target state of the identified food item and calculating a food spoilage level based on the comparison.

According to another aspect of the present disclosure, the method includes updating, at an appliance controller in communication with the processor, a cooling operation of the storage appliance based on the food spoilage level.

According to another aspect of the present disclosure, the method includes identifying the food item based on the modified image data.

According to another aspect of the present disclosure, the method includes the image taken from an initial view of the storage cavity.

According to another aspect of the present disclosure, the method includes determining a transformation matrix based on the position of the support member. The method further includes processing the image in the transformation matrix to generate a target view of the storage cavity different than the initial view.

According to another aspect of the present disclosure, the method includes communicating an instruction to present the target view at a display in communication with the processor.

According to another aspect of the present disclosure, the method includes determining a food spoilage level of the food item based on the target view. The method further includes communicating, via the processor, a signal to an appliance controller to control a heating operation based on the food spoilage level.

According to another aspect of the present disclosure, the method includes receiving, at the processor, target image data demonstrating a target state of the food item, and determining the target view based on the target image data.

According to another aspect of the present disclosure, a climate-controlled storage system includes a storage appliance that includes a storage cavity for receiving a food item. A support member is disposed in the storage cavity configured to support the food item thereon. An imaging device is configured to capture an image of the storage cavity from an initial view. A processor is in communication with the imaging device and configured to identify the support member based on the image, determine a histogram of gradients based on the image, and determine a position of the support member based on the histogram of gradients.

According to another aspect of the present disclosure, the processor is further configured to determine a transformation matrix based on the position of the support member and process the image in the transformation matrix to generate a target view of the storage cavity different than the initial view.

According to another aspect of the present disclosure, a display is in communication with the processor. The processor is further configured to communicate an instruction to present the target view at the display.

According to another aspect of the present disclosure, a cooling device is in the storage cavity. An appliance controller is in communication with the cooling device and the processor. The processor is further configured to determine a food spoilage level of the food item based on the target view. The appliance controller is configured to control the cooling device based on the food spoilage level.

According to another aspect of the present disclosure, an image processing method for a refrigerator system includes capturing, via an imaging device, an image of a storage cavity of a refrigerator from an initial view. The method further includes identifying a support shelf in the storage cavity based on the image via a processor in communication with the imaging device. The support shelf is configured to support a food item thereon. The method further includes determining a histogram of gradients based on the support shelf in the image via the processor. The method further includes determining a position of the support shelf based on the histogram of gradients. The method further includes determining a transformation matrix based on the position of the support shelf. The method further includes processing the image in the transformation matrix to generate a target view of the storage cavity different than the initial view.

According to another aspect of the present disclosure, the method includes determining a food spoilage level of the food item based on the target view. The method further includes communicating, via the processor, a signal to an appliance controller of the refrigerator to control a cooling operation based on the food spoilage level.

According to another aspect of the present disclosure, an image processing method for a dish treatment system includes capturing, via at least one imaging device, an image of a treatment cavity of a dish treatment appliance. The method further includes identifying a support member in the treatment cavity based on the image via a processor in communication with the at least one imaging device. The support member is configured to support a dish thereon. The method further includes determining a histogram of gradients based on the image via the processor. The method further includes determining a position of the support member based on the histogram of gradients.

According to another aspect of the present disclosure, the method includes estimating a volume of objects in the treatment cavity based on the histogram of gradients. The method further includes comparing a volume of the treatment cavity in an empty state estimated volume of the objects. The method further includes determining a fill level of the treatment cavity based on the comparison of the volume of the treatment cavity in the empty state to the volume of the objects.

According to another aspect of the present disclosure, the method includes modifying the image via brightness normalization prior to determining the histogram of gradients.

According to another aspect of the present disclosure, the method includes processing the image in a convolutional neural network configured to generate a mask indicating an obstruction overlaying a view of the food item. The method further includes removing a portion of the image corresponding to a first region defined by the mask.

According to another aspect of the present disclosure, the method includes determining surrounding pixel values corresponding to a second region of the image adjacent to the first region. The method further includes calculating target pixel values for the first region based on the surrounding pixel values. The method further includes modifying the portion of the image to include the target pixel values for the first region.

According to another aspect of the present disclosure, the method includes outputting, via the processor, modified image data to a display demonstrating the dish clear of the obstruction.

According to another aspect of the present disclosure, the method includes calculating a dish cleanliness level based on the modified image data.

According to another aspect of the present disclosure, the method includes updating, at an appliance controller in communication with the processor, a treatment operation of the dish treatment appliance based on the dish cleanliness level.

According to another aspect of the present disclosure, the method includes identifying the dish based on the modified image data.

According to another aspect of the present disclosure, the image is taken from an initial view of the treatment cavity.

According to another aspect of the present disclosure, the method includes determining a transformation matrix based on the position of the support member. The method further includes processing the image in the transformation matrix to generate a target view of the treatment cavity different than the initial view.

According to another aspect of the present disclosure, the method includes communicating an instruction to present the target view at a display in communication with the processor.

According to another aspect of the present disclosure, the method includes determining a dish cleanliness level of the dish based on the target view. The method further includes communicating, via the processor, a signal to an appliance controller to control a treatment operation based on the food doneness level.

According to another aspect of the present disclosure, the method includes receiving, at the processor, target image data demonstrating a target state of the dish. The method further includes determining the target view based on the target image data.

According to another aspect of the present disclosure, a dish treatment system includes a dish treatment appliance that includes a treatment cavity for receiving a dish. A support member is disposed in the treatment cavity configured to support the dish thereon. An imaging device is configured to capture an image of the treatment cavity from an initial view. A processor is in communication with the imaging device and configured to identify the support member based on the image, determine a histogram of gradients based on the image, and determine a position of the support member based on the histogram of gradients.

According to another aspect of the present disclosure, the processor is further configured to determine a transformation matrix based on the position of the support member and process the image in the transformation matrix to generate a target view of the treatment cavity different than the initial view.

According to another aspect of the present disclosure, the system further includes a display in communication with the processor. The processor is further configured to communicate an instruction to present the target view at the display.

According to another aspect of the present disclosure, the system includes a pump in fluid communication with the treatment cavity. An appliance controller is in communication with the pump and the processor. The processor is further configured to determine a dish treatment level of the dish based on the target view. The appliance controller is configured to control the pump based on the dish treatment level.

According to another aspect of the present disclosure, an image processing method for a dishwasher system includes capturing, via an imaging device, an image of a treatment cavity of a dishwasher from an initial view. The method further includes identifying a support rack in the treatment cavity based on the image via a processor in communication with the imaging device. The support rack is configured to support a dish thereon. The method further includes determining a histogram of gradients based on an orientation of a rail of the support rack in the image via the processor. The method further includes determining a position of the support rack based on the histogram of gradients. The method further includes determining a transformation matrix based on the position of the support rack. The method further includes processing the image in the transformation matrix to generate a target view of the treatment cavity different than the initial view.

According to another aspect of the present disclosure, the method includes determining a dish cleanliness level of the dish based on the target view. The method further includes communicating, via the processor, a signal to an appliance controller of the dishwasher to control a treatment operation based on the dish cleanliness level.

According to another aspect of the present disclosure, a method for processing images of an appliance includes capturing, via at least one imaging device, an image of a cavity of the appliance. The method further includes identifying a support member in the cavity based on the image via a processor in communication with the at least one imaging device. The support member is configured to support an object thereon. The method further includes determining a histogram of gradients based on the image via the processor. The method further includes determining a position of the support member based on the histogram of gradients. The method further includes determining a position of the object based on the position of the support member.

According to another aspect of the present disclosure, the method further includes receiving a target image data for the object. The method further includes determining a target view for the image based on the target image data. The method further includes comparing the target image data to the image. The method further includes determining a transformation matrix based on the comparison of the target image to the image. The method further includes applying the transformation matrix to the image to generate a modified image having the target view.

According to another aspect of the present disclosure, the image is captured from an initial view different than the target view.

According to another aspect of the present disclosure, the image is captured via a mobile device separate from the appliance.

According to another aspect of the present disclosure, the image is captured via a camera mounted to the appliance.

According to another aspect of the present disclosure, the method further includes comparing the modified image to the target image. The method further includes determining a status of the object based on the comparison to the target image.

According to another aspect of the present disclosure, the status is a food doneness level of a food item. The cavity is a cooking cavity of a cooking appliance.

According to another aspect of the present disclosure, the histogram of gradients includes a plurality of gradients indicating a height level of at least one rod of the support member.

According to another aspect of the present disclosure, the status is a freshness level of a food item. The cavity is a climate-controlled storage cavity of a refrigerator.

According to another aspect of the present disclosure, the histogram of gradients includes a plurality of gradients indicating a height level of a shelf of the support member.

According to another aspect of the present disclosure, the status is a cleanliness level of a dish. The cavity is a dish treatment cavity of a dishwasher.

According to another aspect of the present disclosure, the histogram of gradients includes a plurality of gradients indicating an open space amongst a drawer of the dishwasher.

According to another aspect of the present disclosure, an image processing system for an appliance includes a camera configured to capture an image of a cavity of the appliance. A support member is disposed in the cavity and configured to support an object thereon. A processor is in communication with the camera and configured to identify the support member based on the image, determine a histogram of gradients based on the image, determine a position of the support member based on the histogram of gradients, and determine a position of the object based on the position of the support member.

According to another aspect of the present disclosure, the processor is further configured to receive a target image data for the object, determine a target view for the image based on the target image data, compare the target image data to the image, determine a transformation matrix based on the comparison of the target image to the image, and apply the transformation matrix to the image to generate a modified image having the target view.

According to another aspect of the present disclosure, the image is captured from an initial view different than the target view.

According to another aspect of the present disclosure, a method for processing images of an appliance includes capturing, via an imaging device, an image of a cavity of the appliance, identifying a support member in the cavity based on the image via a processor in communication with the imaging device, the support member configured to support an object thereon, calculating a histogram of gradients based on the image via the processor, receiving dimensional data of the appliance, comparing the histogram of gradients to the dimensional data, and determining a position of the support member based on the comparison of the histogram of gradients to the dimensional data.

According to another aspect of the present disclosure, the method includes determining a transformation for the image to align the histogram of gradients with the dimensional data.

According to another aspect of the present disclosure, the method includes determining a viewing angle of the imaging device based on the transformation.

According to another aspect of the present disclosure, determining the viewing angle of the imaging device includes determining a position of the imaging device relative to the appliance.

According to another aspect of the present disclosure, the histogram of gradients includes identification features of the appliance, and the comparison of the histogram of gradients includes comparing the identification features with the dimensional data.

According to another aspect of the present disclosure, the identification features align with a shape of the cavity.

According to another aspect of the present disclosure, the identification features are edges of an opening of the cavity.

According to another aspect of the present disclosure, the method includes processing the histogram of gradients and the dimensional data in a generative adversarial network trained to determine the transformation.

According to another aspect of the present disclosure, the method includes training the generative adversarial network with reference image data that includes views of the cavity from a plurality of viewing angles and a plurality of viewing distances.

According to another aspect of the present disclosure, the method includes processing the histogram of gradients and the dimensional data in a convolutional neural network trained to determine the transformation.

According to another aspect of the present disclosure, the convolutional neural network is further trained to determine the position of the support member.

According to another aspect of the present disclosure, determining a position of the object based on the position of the support member.

According to another aspect of the present disclosure, the method includes receiving target image data for the object, determining a target view for the image based on the target image data, comparing the target image data to the image, determining a transformation matrix based on the comparison of the target image data to the image, and applying the transformation matrix to the image to generate a modified image having the target view.

According to another aspect of the present disclosure, the image is captured from an initial view different than the target view.

According to another aspect of the present disclosure, a system for processing images of an appliance includes an imaging device configured to capture an image of a cavity of the appliance. The system includes a support member disposed in the cavity configured to support an object thereon. The system includes a processor in communication with the imaging device configured to determine dimensional data of the appliance based on an identity of the appliance, calculate a histogram of gradients based on the image, compare the histogram of gradients to the dimensional data, and determine a position of a support member in the cavity based on the comparison of the histogram of gradients to the dimensional data.

According to another aspect of the present disclosure, the processor is further configured to determine a transformation for the image to align the histogram of gradients with the dimensional data.

According to another aspect of the present disclosure, the processor is further configured to determine a viewing angle of the imaging device based on the transformation.

According to another aspect of the present disclosure, determining the viewing angle of the imaging device includes determining a position of the imaging device relative to the appliance.

According to another aspect of the present disclosure, a system for processing images of an appliance includes an imaging device configured to capture an image of a cavity of the appliance. The system includes a support member disposed in the cavity configured to support an object thereon. The system includes a processor in communication with the imaging device configured to identify the support member in the cavity based on the image, compare the image to target image data of the cavity, wherein the target image data includes a plurality of images having support members positioned at a plurality of heights in the cavity, determine a position of the support member based on the comparison of the image to the target image data, and determine a location of the object based on the position of the support member.

According to another aspect of the present disclosure, the processor is further configured to determine a target view for the image based on the target image data, determine a transformation matrix based on the comparison of the target image data to the image, and apply the transformation matrix to the image to generate a modified image having the target view.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for processing images of an appliance, comprising:
    capturing, via an imaging device, an image of a cavity of the appliance;
    identifying a support member in the cavity based on the image via a processor in communication with the imaging device, the support member configured to support an object thereon;
    calculating a histogram of gradients based on the image via the processor;
    receiving dimensional data of the appliance;
    comparing the histogram of gradients to the dimensional data;
    determining a position of the support member based on the comparison of the histogram of gradients to the dimensional data;
    determining a transformation for the image to align the histogram of gradients with the dimensional data; and
    determining a viewing angle of the imaging device based on the transformation.

2. The method of claim 1, wherein determining the viewing angle of the imaging device includes determining a position of the imaging device relative to the appliance.

3. The method of claim 1, wherein the histogram of gradients includes identification features of the appliance, and wherein the comparison of the histogram of gradients includes comparing the identification features with the dimensional data.

4. The method of claim 3, wherein the identification features align with a shape of the cavity.

5. The method of claim 3, wherein the identification features are edges of an opening of the cavity.

6. The method of claim 1, further comprising:
    processing the histogram of gradients and the dimensional data in a generative adversarial network trained to determine the transformation.

7. The method of claim 6, further comprising:
    training the generative adversarial network with reference image data that includes views of the cavity from a plurality of viewing angles and a plurality of viewing distances.

8. The method of claim 1, further comprising:
    processing the histogram of gradients and the dimensional data in a convolutional neural network trained to determine the transformation.

9. The method of claim 8, wherein the convolutional neural network is further trained to determine the position of the support member.

10. The method of claim 1, further comprising:
    determining a position of the object based on the position of the support member.

11. The method of claim 1, further comprising:
    receiving target image data for the object;
    determining a target view for the image based on the target image data;
    comparing the target image data to the image;
    determining a transformation matrix based on the comparison of the target image data to the image; and
    applying the transformation matrix to the image to generate a modified image having the target view.

12. The method of claim 11, wherein the image is captured from an initial view different than the target view.

13. A system for processing images of an appliance, comprising:
    an imaging device configured to capture an image of a cavity of the appliance;
    a support member disposed in the cavity configured to support an object thereon; and
    a processor in communication with the imaging device configured to:
        determine dimensional data of the appliance based on an identity of the appliance;
        calculate a histogram of gradients based on the image;
        compare the histogram of gradients to the dimensional data;
        determine a position of a support member in the cavity based on the comparison of the histogram of gradients to the dimensional data;
        receive target image data for the object;
        determine a target view for the image based on the target image data;
        compare the target image data to the image;
        determine a transformation matrix based on the comparison of the target image data to the image; and
        apply the transformation matrix to the image to generate a modified image having the target view, wherein the target view has a viewpoint different than a viewpoint of the image.

14. The system of claim 13, wherein the processor is further configured to:
    determine a transformation for the image to align the histogram of gradients with the dimensional data.

15. The system of claim 14, wherein the processor is further configured to:
    determine the viewing angle of the imaging device based on the transformation.

16. The system of claim 15, wherein determining the viewing angle of the imaging device includes determining a position of the imaging device relative to the appliance.

17. A system for processing images of an appliance, comprising:
    an imaging device configured to capture an image of a cavity of the appliance;
    a support member disposed in the cavity configured to support an object thereon; and
    a processor in communication with the imaging device configured to:
        identify the support member in the cavity based on the image;

compare the image to target image data of the cavity,
wherein the target image data includes a plurality of
images having support members positioned at a
plurality of heights in the cavity;

determine a position of the support member based on 5
the comparison of the image to the target image data;

determine a location of the object based on the position
of the support member;

determine a target view for the image based on the
target image data; 10 determine a transformation matrix based on the com-
parison of the target image data to the image,
wherein the target view has a viewpoint different
than a viewpoint of the image.

18. The system of claim 17, wherein the processor is 15
further configured to:

apply the transformation matrix to the image to generate
a modified image having the target view.

\* \* \* \* \*